United States Patent
Martucci et al.

(10) Patent No.: US 8,560,394 B2
(45) Date of Patent: Oct. 15, 2013

(54) SYSTEM AND METHOD TO ENABLE A CUSTOMER TO SELECT A WINE BASED UPON AVAILABLE INVENTORY

(75) Inventors: Jennifer Martucci, Muttontown, NY (US); Patrick Martucci, Muttontown, NY (US)

(73) Assignee: Incentient, LLC, Plainview, NY (US)

( * ) Notice: Subject to any disclaimer, the term of this patent is extended or adjusted under 35 U.S.C. 154(b) by 0 days.

(21) Appl. No.: 13/181,385

(22) Filed: Jul. 12, 2011

(65) Prior Publication Data

US 2012/0030042 A1  Feb. 2, 2012

Related U.S. Application Data

(60) Provisional application No. 61/363,548, filed on Jul. 12, 2010.

(51) Int. Cl.
*G06Q 30/00* (2012.01)

(52) U.S. Cl.
USPC .................. 705/22; 340/572.1; 455/414.3

(58) Field of Classification Search
USPC ........ 705/27.1, 28, 30, 34, 7.22, 15, 22, 26.1, 705/26.3; 700/231, 232, 236, 237; 340/572.1; 455/414.1, 414.3
See application file for complete search history.

(56) References Cited

U.S. PATENT DOCUMENTS

| | | | |
|---|---|---|---|
| 4,415,065 A * | 11/1983 | Sandstedt | 705/34 |
| 4,569,421 A * | 2/1986 | Sandstedt | 186/39 |
| 5,193,648 A * | 3/1993 | Yuter | 186/38 |
| 5,200,909 A * | 4/1993 | Juergens | 702/25 |
| 5,839,115 A * | 11/1998 | Coleman | 705/15 |
| 5,845,263 A * | 12/1998 | Camaisa et al. | 705/15 |
| 6,425,524 B2 * | 7/2002 | Pentel | 235/381 |
| 6,435,406 B1 * | 8/2002 | Pentel | 235/380 |
| 6,473,739 B1 * | 10/2002 | Showghi et al. | 705/15 |
| 6,634,835 B1 | 10/2003 | Smith | |
| 6,636,835 B2 * | 10/2003 | Ragsdale-Elliott et al. | 705/15 |
| 6,819,976 B2 * | 11/2004 | Kimura | 700/237 |
| 6,842,719 B1 * | 1/2005 | Fitzpatrick et al. | 702/182 |
| 6,873,970 B2 * | 3/2005 | Showghi et al. | 705/7.22 |
| 6,880,750 B2 * | 4/2005 | Pentel | 235/380 |
| 6,982,733 B1 * | 1/2006 | McNally et al. | 715/810 |
| 7,024,382 B2 * | 4/2006 | Nelson | 705/26.62 |
| 7,114,146 B2 * | 9/2006 | Zhang et al. | 717/106 |
| 7,234,640 B2 * | 6/2007 | Pentel | 235/384 |
| 7,376,371 B2 * | 5/2008 | Mori | 399/111 |
| 7,453,371 B2 * | 11/2008 | Niyama et al. | 340/12.54 |
| 7,454,370 B2 * | 11/2008 | Baril et al. | 705/14.4 |
| 7,505,929 B2 * | 3/2009 | Angert et al. | 705/26.3 |
| 7,606,732 B2 * | 10/2009 | Raghunathan et al. | 705/15 |
| 7,628,325 B2 * | 12/2009 | McIntosh | 235/385 |
| 7,801,770 B2 * | 9/2010 | Nelson | 705/26.1 |
| 7,949,529 B2 * | 5/2011 | Weider et al. | 704/270 |
| 7,999,674 B2 * | 8/2011 | Kamen | 340/572.1 |
| 8,123,130 B2 * | 2/2012 | Pentel | 235/384 |
| 8,146,077 B2 * | 3/2012 | McNally et al. | 717/177 |

(Continued)

*Primary Examiner* — Andrew Joseph Rudy
(74) *Attorney, Agent, or Firm* — Howison & Arnott, L.L.P.

(57) ABSTRACT

A system for aiding a restaurant patron to make a wine selection from wines available in the restaurant wine inventory includes a plurality of dedicated patron display devices and a content management system including a processor, a communications interface and a database wherein the dedicated patron display devices are operable to receive and display screens transmitted from the content management system and transmit patron input to the content management system in order to select a wine from the restaurant inventory.

12 Claims, 23 Drawing Sheets

(56) References Cited

U.S. PATENT DOCUMENTS

| | | | |
|---|---|---|---|
| 8,150,739 B1 * | 4/2012 | Marggraff et al. | 705/26.61 |
| 8,174,489 B2 * | 5/2012 | Sorensson et al. | 345/105 |
| 8,190,483 B2 * | 5/2012 | Woycik et al. | 705/26.1 |
| 8,195,468 B2 * | 6/2012 | Weider et al. | 704/275 |
| 8,209,219 B2 * | 6/2012 | Fitzpatrick et al. | 705/7.31 |
| 8,219,558 B1 * | 7/2012 | Trandal et al. | 707/736 |
| 8,224,718 B1 * | 7/2012 | Sholtis et al. | 705/28 |
| 8,239,285 B1 * | 8/2012 | Marggraff et al. | 705/26.61 |
| 8,294,581 B2 * | 10/2012 | Kamen | 340/572.1 |
| 8,364,545 B2 * | 1/2013 | Arsenault | 705/16 |
| 8,385,896 B2 * | 2/2013 | Proctor et al. | 455/414.3 |
| 2002/0188495 A1 * | 12/2002 | Banerjee et al. | 705/10 |

\* cited by examiner

110

| Red/White | white | ... |
|---|---|---|
| Variety | Chardonnay | ... |
| Country | France | ... |
| Region | ----- -- --- ---- -- ----- ---- ---- | ... |
| Appellation | ---- -- --- ---- ----- ---- | ... |
| Label | -- --- --- --- ---- | ... |
| Vineyard | ---- -- ---- -- ---- --- ---- ---- | ... |
| Recommendation | Seafood | ... |
| Rating | *** | ... |
| Price | $42.00 | ... |
| Inventory | 10 bottles | ... |
| Hold | 2 bottles | ... |
| Alternative Selection | ---- ---- --- -- --- --- ---- ---- | ... |
| Supplier | --- -- --- -- ---- ---- --- ---- | ... |
| Wine Detail | -- --- ---- -- ---- ---- -- -- ---- --- -- | ... |

*FIG. 1B*

| Italy | You may sort the wine results by touching one of the criteria at the right. | | |
|---|---|---|---|
| La Versa, Pinot Noir Pavia Igt, Lombardy, Italy, 2007 | $35 #21793 | Fontanavecchia, Aglianico del Tabumo Doc, Campania, Italy, 2005 | $43 #B037 | Sort results by |
| Principi di Butera, Syrah Sicilia Igt, Sicily, Italy, 2006 | $37 #21912 | La Mozza, I Perazzi Morellino di Scansano Docg, Tuscany, Italy, 2007 | $43 #26262 | (abc) — 522 Name |
| Rosa del Golfo Scaliere Negroamaro, Salento Igt, Apulia, Italy, 2008 | $37 #B024 | Frecciarossa, Uva Rara, Pavia Igt, Lombardy, Italy, 2006 | $44 #25271 | ($) — 524 Price |
| Ca' Bolani, Refosco dal Peduncolo Rosso, Friuli Aquileia Doc, Friuli, Italy, 2006 | $40 #25082 | Tormaresca, Neprica, Puglia Igt, Apulia, Italy, 2008 | $44 #21987 | (20 05) — 526 Vintage |
| Tenuta La Zolla, Barbera d'Alba Superiore Doc, Piemont, Italy, 2006 | $42 #21795 | Librandi, Duca Sanfellice Ciro' Doc Riserva, Calabria, Italy, 2005 | $45 #8852 | |

[back] [new search] [view selects] ●○○○○○○○○○ [next page] — 528

*FIG. 5E*

SYSTEM AND METHOD TO ENABLE A CUSTOMER TO SELECT A WINE BASED UPON AVAILABLE INVENTORY

CROSS-REFERENCE TO RELATED APPLICATIONS

This application claims benefit of U.S. Provisional Application No. 61/363,548, filed on Jul. 12, 2010, and entitled SYSTEM AND METHOD TO ENABLE A CUSTOMER TO SELECT A WINE BASED UPON AVAILABLE INVENTORY

TECHNICAL FIELD

The disclosure relates to a system and method for aiding patrons of establishments such as restaurants in selecting wines and drinks and for collecting information regarding such selections.

BACKGROUND

Restaurants and similar establishments, in particular more exclusive restaurants, that serve wine present their patrons with wine lists from which the patrons select a wine or wines to accompany their meals. Such wine lists vary from plastic laminated sheets to heavy leather bound volumes and often contain limited information regarding the individual listed wines. Such wine lists do not reflect the restaurant wine cellar's inventory of a particular wine at a particular time. Further, changing such wine lists may require reprinting and replacing pages of the list, a time consuming and potentially expensive process. Thus, there exists a need for an improved system and method for enabling a restaurant patron to make a wine selection based upon the available inventory of the restaurant and which provides the patron with more information regarding the available wines.

SUMMARY

In one embodiment, a method of enabling a restaurant patron to make a wine selection based on available wine inventory at the restaurant includes providing interactive patron display devices for use by patrons in making a wine selection based on available wine inventory at the restaurant. The interactive hand held devices typically include a graphical user interface such as a touch screen which enables a patron to systematically search wines available in the restaurant's wine inventory. A first selection screen identifying at least one characteristic associated with wines in the restaurant inventory may be received from a content management system with one of the interactive patron display devices that prompts the patron to make a first selection. The patron response to the first selection screen is received with the interactive patron display device and transmitted to the content management system.

Based upon the patron's response to the first selection screen, the content management system may identify a subsequent selection screen. The subsequent selection screen may be identified based upon one or more wine characteristics identified in response to one or more prior selection screens. The subsequent selection screen is transmitted from the content management system to the patron display device and presented to the patron. For example, if the patron selects red wines in response to the first selection screen the second (subsequent) selection screen may list varieties of red wines available in the restaurant inventory, prompting the patron to select a particular wine or variety or wine, e.g. a Pinot Noir, a Cabernet, a Merlot etc. The patron's second or subsequent response is received with the patron display device and transmitted to the content management system which may then identify another selection screen for display to the patron. The process is repeated until the patron's search is narrowed to a particular wine.

After the patron has selected a particular wine or wines, the content management system may transmit a confirmation screen prompting the patron to select an order complete message or to make a different selection. The patron's response to the confirmation screen is received with the patron display device and transmitted to the content management system which records the patron's responses to each of the selection screens in a database associated with the content management system. In one embodiment, the patron is then prompted to return the patron display device to the sommelier or waiter who then processes the order.

In another embodiment, a system for aiding a restaurant patron to make a wine selection from wines available in the restaurant wine inventory includes a plurality of dedicated patron display devices. The patron display devices may include a first wired or wireless communications interface and a graphical user interface such as a touch screen display, such that the patron display devices are operable to receive an input from a patron.

The system may further include a content management system wherein the dedicated patron display devices are operable to receive display screens transmitted from the content management system and transmit patron input to the content management system. In one embodiment, the content management system includes one or more processors, a second communications interface and at least one data storage associated with the processor or processors. The data storage device may include a database of wines available in inventory at the restaurant and characteristics of the wines available in inventory at the restaurant. The database may also include a plurality of selection screens and informational screens for display by the dedicated patron selection display devices. The display screens are designed to enable a patron to select a wine based upon characteristics associated with the wine and other information such as the producer, the country or region of origin of the wine and the price of the wine.

In different embodiments, the communications interface of the patron display devices may be wired or wireless. In one embodiment, the patron display devices are portable, hand held devices including a graphical user interface such as a touch screen display. In other embodiments the patron display devices may be affixed to patron tables or other fixtures such that a patron may conveniently access the devices. In different variations, the system may include a wired or wireless communications link between the content management system and a restaurant inventory control system whereby the available inventory of wines recorded in the restaurant inventory control system is updated on a real time basis. The system may also include a wired or wireless communications link between the content management system and a point of sale device whereby patron wine selections are transmitted from the content management system to the point of sale device for processing.

BRIEF DESCRIPTION OF THE DRAWINGS

For a more complete understanding, reference is now made to the following description taken in conjunction with the accompanying Drawings in which:

FIG. 1B is a simplified representation of a database that may be employed by content to facilitate wine selections according to the system and method described herein;

FIGS. 5A through 5J are a series of screens that may be displayed on patron display and selection device to aid a patron in making wine selections;

DETAILED DESCRIPTION

Figure 1A:
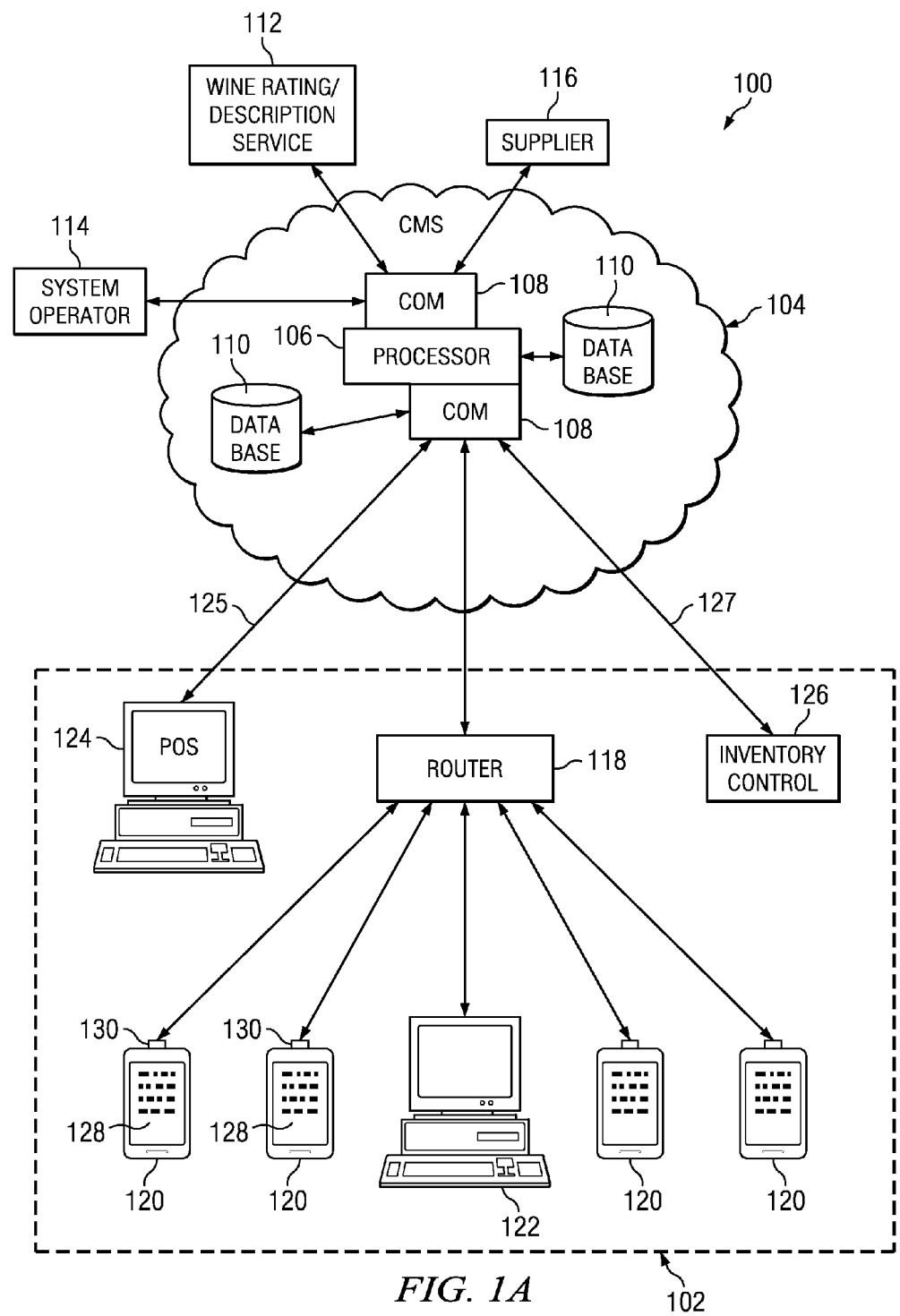
FIG. 1A is a diagrammatic representation of a system 100 to aid and enable a customer to select a wine.

Referring now to the drawings, wherein like reference numbers are used herein to designate like elements throughout, the various views and embodiments of a system and method to enable a customer to select a wine based upon available inventory are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

FIG. 1A is a diagrammatic representation of a system 100 to aid and enable a customer to select a wine. System 100 is particularly suitable for use in restaurants and similar establishments that serve wine with meals or food. System 100 includes a content management system 104 adapted to service one or more restaurants 102 or similar establishments. In one embodiment, content management system 104 includes one or more processors 106 having data communications interfaces 108. Communications interfaces 108 may be wired, wireless, or a combination of wired and wireless interfaces. Interfaces 108 enable content management system 104 to communicate with, for example wine reading and/or description service 112, wine suppliers 116 and a system operator 114 that maintains the content management system. Also associated with content management system 104 are databases 110 that may be used to store a variety of information relating to wines that may be provided to patrons of restaurant 102. As will be appreciated, content management system 104 may be real, i.e., embodied in a single dedicated processor and associated databases or virtual in which case the content management system may incorporate a number of processors and databases located at different locations that are linked via a private or public network such as the internet.

In one embodiment, system 100 employs a plurality of patron display devices 120 that may be presented to and used by patrons of restaurant 102 in order to select and/or order wines available in inventory at the restaurant. Patron display devices 120 may be small, portable devices incorporating a graphical user interface such as touch screen display 128 and a wireless communications interface 130. In other embodiments, patron display devices 120 may include a wired or wireless communications interface and be permanently affixed to tables or other fixtures in restaurant 102 at locations convenient to patrons of the restaurant. Patron display devices 120 communicate with content management system 104 via a router 118 which may be located in, or in close proximity to, restaurant 102 to facilitate wireless communications between the patron display device and the router. Router 118 enables communications and data transfer between patron display devices 120 and content management system 104. Typically, patron display devices 120 will be dedicated, preprogrammed "thin clients" i.e., the patron display devices will be provided with a touch screen display, a communication interface and sufficient processing power to receive and transmit information back and forth to content management system 104 and to display various screens to patrons.

Referring still to FIG. 1A, an administrative workstation 122 may also be provided to enable employees of restaurant 102 to communicate with content management system 104 via router 118 to perform administrative functions. Such functions may include report generation, adding or detecting wines from database 110 of content management system 104, access control and similar functions. Content management system 104 may also communicate with a point of sale system 124 of restaurant 102 via a wired or wireless communications link 125 to enable a patron to place an order for wine directly from a patron display device 120 and to facilitate record keeping for the transaction. This feature may eliminate the need for a sommelier or waiter to take and process an order for the wine or wines selected by the patron using a point of sale system. Content management system 104 may also communicate with an inventory control system 126 of restaurant 102 via a wired or wireless communications link 127 to enable content management system 104 to maintain an accurate record of wines available in restaurant 102 and to facilitate restocking and inventory record keeping.

In one embodiment, system 100 may be owned and operated by a third party system operator 114. In this case, a system operator 114 may own, operate and maintain content management system 104 and the associated components of system 100. This arrangement alleviates the need for a capital investment by the owner or operator of restaurant 102 along with the associated time and expense involved in maintaining system 100. As will be appreciated, where system 100 is owned and/or operated by a third party system operator 114 a single content management system 104 may be configured to service multiple restaurants or similar establishments at different locations.

FIG. 1B is a simplified representation of a database that may be employed by content management system 104 in order to facilitate wine selections by patrons of the restaurant 102. As illustrated, the database may include wine classification by red or white, variety, country, region and appellation. Other information that may be incorporated into the database includes photos or representations of the label(s) placed on wine bottles, the particular vineyard or information relating to the vineyard from which the wine was produced, and recommendations, i.e., whether a particular wine is recommended in combination with seafood or red meat. Other information that may be incorporated into the database may include a rating for different wines, the price of different wines, the inventory of a particular wine in the restaurant's stock and whether all or any of the inventory is on hold for a patron.

Alternative wine selections may be incorporated into the database for use when a particular wine is unavailable in inventory. The wine producer, supplier and/or vendor along with other details relating to a wine may also be incorporated into the database. It will be appreciated that the representation presented in FIG. 1B is exemplary only. In different variations, a plurality of relational databases may be employed to store and provide information relating to different wines that may be stocked by restaurant 102. Such relational databases may be keyed or linked by parameters such as wine type, country, region, price and other characteristics.

Figure 2:
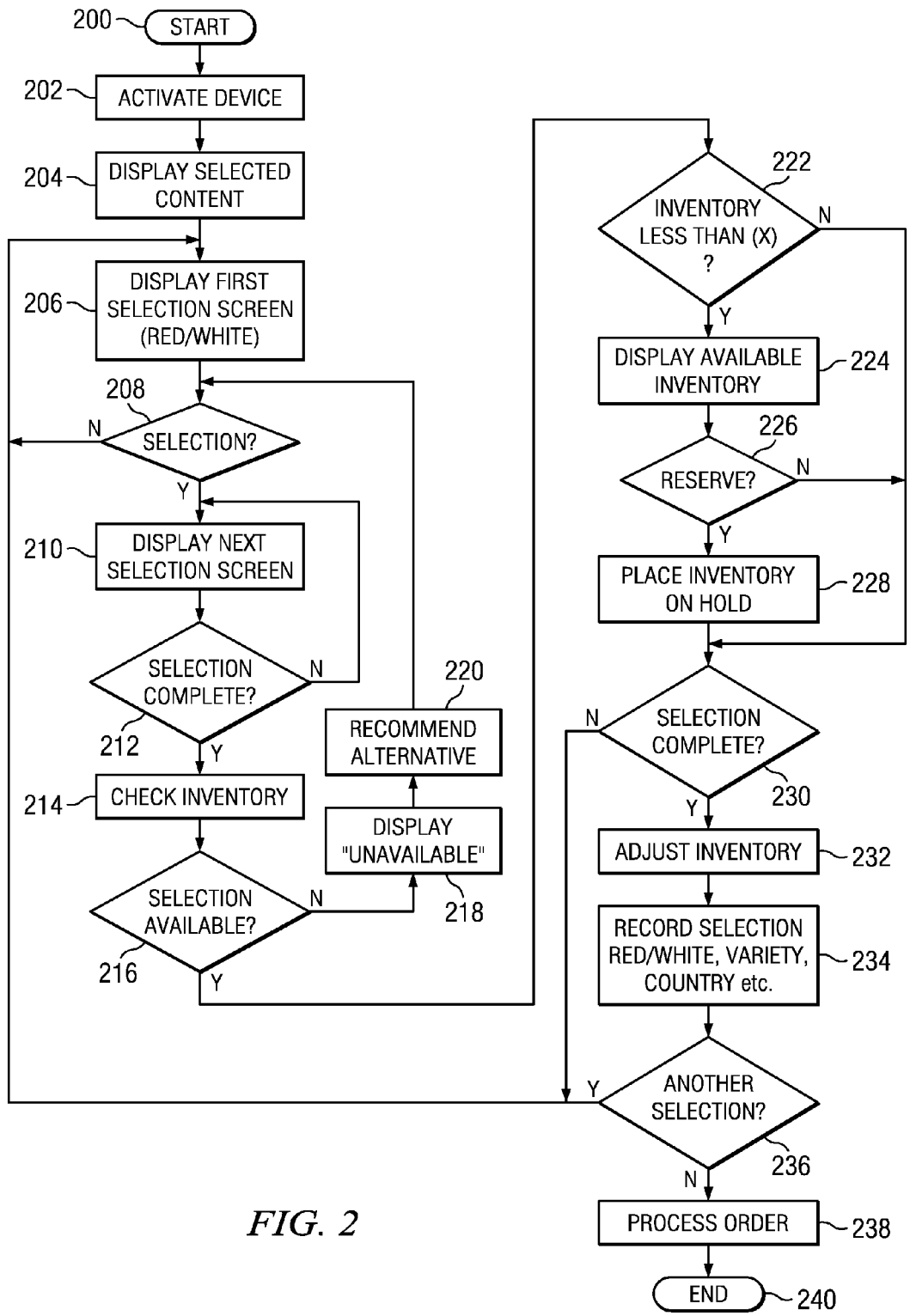
FIG. 2 is a flow chart illustrating a mode of operation of a wine selection and/or ordering system as described herein.

FIG. 2 is a flow chart illustrating a mode of operation of a wine selection and/or ordering system as described herein. The process begins at step 200 where a restaurant patron is presented with a patron display device 120 (FIG. 1A). At step 202 the patron activates the device which displays selected content at step 204. The selected content may be promotional materials for the particular establishment, for particular drinks and dishes served by the restaurant or related goods or services. In some embodiments, the content displayed at step 204 may comprise third party promotional materials, for example advertisements for theater tickets or similar events. The selected content may be displayed for a predetermined period of time, for example 10 or 15 seconds after which a first selection screen is displayed on patron display device 120 at step 206. An exemplary first selection screen is illustrated in FIG. 5B. It will be appreciated that the various selection screens and content presented on patron display device 120 may not be stored on the patron display device but rather are transmitted from content management system 104 to the patron display devices in response to patron input.

Referring still to FIG. 2, the restaurant patron is prompted at step 206 to make an initial selection, for example a red wine versus a white wine. In one embodiment, the patron may be presented with a selection screen including a choice of searching for wine by the bottle versus wine by the glass. At decision block 208 the restaurant patron may make a selection, for example between a red wine and a white wine. If the patron does not make a selection, the process loops back and continues to display the first selection screen. Assuming that the patron makes a selection at decision block 208, a second or subsequent selection screen may be displayed at step 210. For example, if the patron has selected a red wine, the display may include countries of origin, varieties and/or various red wines available in the restaurant's wine cellar. At decision block 212 it is determined whether the patron has completed a selection. If not, the process loops back to step 210 where a subsequent selection screen is displayed. This subsequent selection screen is typically based upon a patron's response to prior selection screens. For example, if a patron identifies a country or region of origin in response to a prior selection screen, the subsequent selection screen may identify wines originally from that country or region. During the process, a plurality of sequential selection screens may be displayed to the customer to aid in his or her selection. For example, selection screens enabling the patron to choose between countries or origin, regions, varieties, etc. may be sequentially displayed until the patron has narrowed his or her selection to a particular wine.

If the selection process is complete at step 212, the restaurant's inventory of the selected wine may be checked at step 214. In some embodiments, wines that have been depleted from the restaurant's inventory, will not be displayed for selection. Likewise, if the available inventory of a particular wine has been placed on hold by on or more patrons, those wines will not be displayed for selection. This feature may prevent dissatisfaction or frustration on the part of patrons who proceed through the selection process only to find that their selection is unavailable.

At decision block 216, the availability of the selected wine may be determined. If the wine is unavailable, a display may be presented on patron display device 120 at step 218 indicating that the wine is not available. If the wine is unavailable, in one variation, an alternate selection may be displayed to the patron at step 220 after which the process returns to step 208 to facilitate selection of a different wine.

At step 222 the inventory of the selected wine, for example the number of bottles available in the restaurant's wine cellar, is compared to a predetermined value (x), for example four, six or ten bottles. This feature enables a patron who may wish to order multiple bottles of a particular wine to determine whether the desired number of bottles are available. If the number of available bottles is less than the predetermined number at step 224 the available number of bottles may be displayed to the patron. The patron may be given the option at step 226 to reserve some or all of the bottles remaining in the restaurant's inventory. If the patron elects to reserve one or more bottles of the available inventory, that number of bottles may be placed on hold at step 228. If the desired number of bottles is not available, the patron may return to block 206 to re-initiate the selection process.

Thus, a patron with a party that anticipates consuming, for example, four bottles of wine over the course of a dinner may place four bottles of the selected wine on hold for delivery to the patron's table as requested. At step 230, the patron is prompted to indicate whether his or her selection has been completed. If the patron's selection has not been completed, i.e., the patron wishes to change his or her selection or order one or more bottles of a different type of wine, the process loops back to step 210 whereat another selection screen is displayed to the patron. At step 232 the inventory of the selected wine or wines is adjusted in the database of content management system 104.

In one embodiment, the inventory of wines available in restaurant's 102 wine cellar is adjusted serially and continuously on a real time basis as wines are ordered or placed on hold. Wines that are unavailable or where the available inventory has been placed on hold may be removed from the display screens presented to patrons in order to facilitate the selection process.

At step 234, different information regarding the selection process may be recorded and stored in a database 110 of content management system 104. Such information may include the wine selection, e.g., red wine versus white, the particular variety, the country, the price and any other additional information that may be useful for analysis. Such information may, for example, enable the owner or operator of restaurant 102 to identify trends in the consumption of different types of wines, identify trends in terms of the price point that patrons are willing to meet along with seasonal or other variations or changes in patrons' tastes and consumption patterns.

At step 236 the patron may be prompted a final time to determine if the patron wishes to make another selection. If so, the process loops back to step 206 where an initial selection screen is displayed. If the patron has selected all of the wine or wines that he or she wishes, the order is processed at step 238. In one embodiment, the patron may simply hand the patron display device to the sommelier who will place the order for delivery to the patron's table. In other variations, the patron may be prompted to press a "done," "order complete," "order now" or similar display and the order is transmitted from the patron display device 120 to content management system 104 which in turn transmits the order information to a point of sale device 124 for processing. After the order has been placed, the process ends at step 240.

Figure 3:
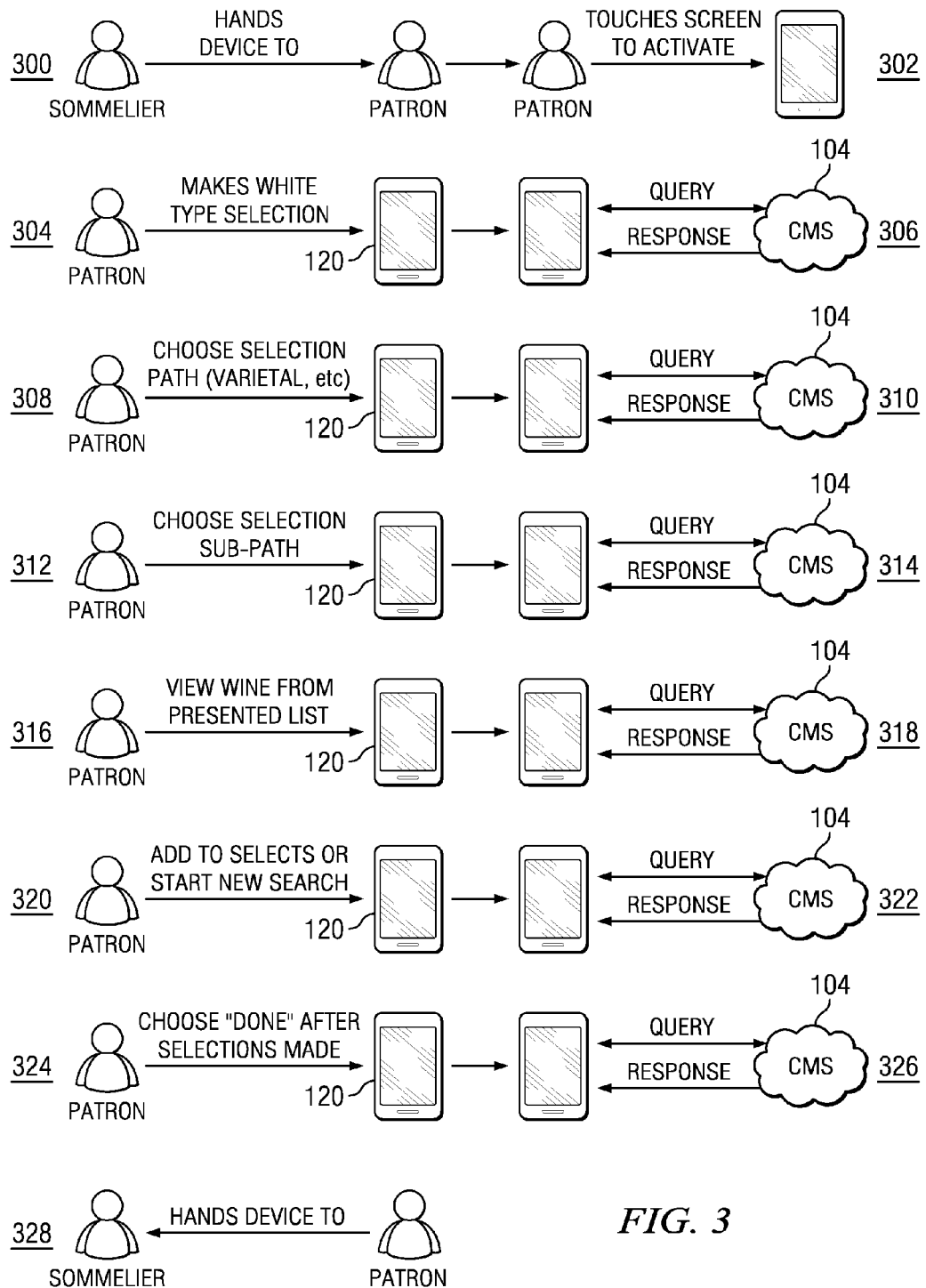
FIG. 3 is a diagrammatic representation of a one selection process as described herein.

FIG. 3 is a diagrammatic representation of a one selection process as described herein. The process begins at step 300 where the sommelier presents a restaurant patron with a patron display device 120 (FIG. 1) for use in making a wine selection. At step 302 the patron touches the touch screen 128 of patron display device 120 to activate the device after which patron is presented with a selection screen prompting the patron to make an initial selection, for example, a red versus a white wine. In the illustrated embodiment, the patron makes a white wine selection at step 304 which is transmitted to content management system 104. Content management system 104 responds at step 306, transmitting a selection screen to the patron that prompts the patron to narrow or refine his or her search at step 308. For example, the patron may be allowed to select a country of origin or a particular variety of grape. The patron's response is transmitted to content management system 104 which may respond at step 310 with another selection screen prompting the patron to further narrow his or her search. The patron may be prompted to select a particular region, vineyard or other criteria defining a selection sub-path. At step 312, the patron selects a selection sub-path or criteria which is transmitted to content management system 104. It will be understood that this may be an iterative process wherein the patron sequentially identifies a number of criteria, narrowing his or her search during the selection process before making a final selection.

At step 314, the content management system 104 responds, transmitting a list of available wines corresponding to the criteria identified by the patron during the selection process. The patron may view the list of available wines at step 316 and make a selection from the list which is transmitted to content management system 104. Content management system 104 may transmit a screen at step 318 to patron selection device 120 prompting the patron to add a wine to his or her selection list or to start a new search. The patron may add a selected wine to his or her selection list at step 320 or elect to start a new search. The patron's response is transmitted to content management system 104 which may respond with a screen at step 322 including an option for the patron to indicate whether or not he or she has completed his or her selection or selections. The patron, at step 324, may select the "done" or "order complete" option which is transmitted to content management system 104. At step 324 content management system 104 may transmit a screen to patron display device 120 listing the wine or wines that the patron has selected. At step 326 the patron is prompted to return the patron display device 120 to the sommelier or waiter at step 328 with a list of selected wines after which the sommelier or waiter may process the patron's order.

Figure 4:
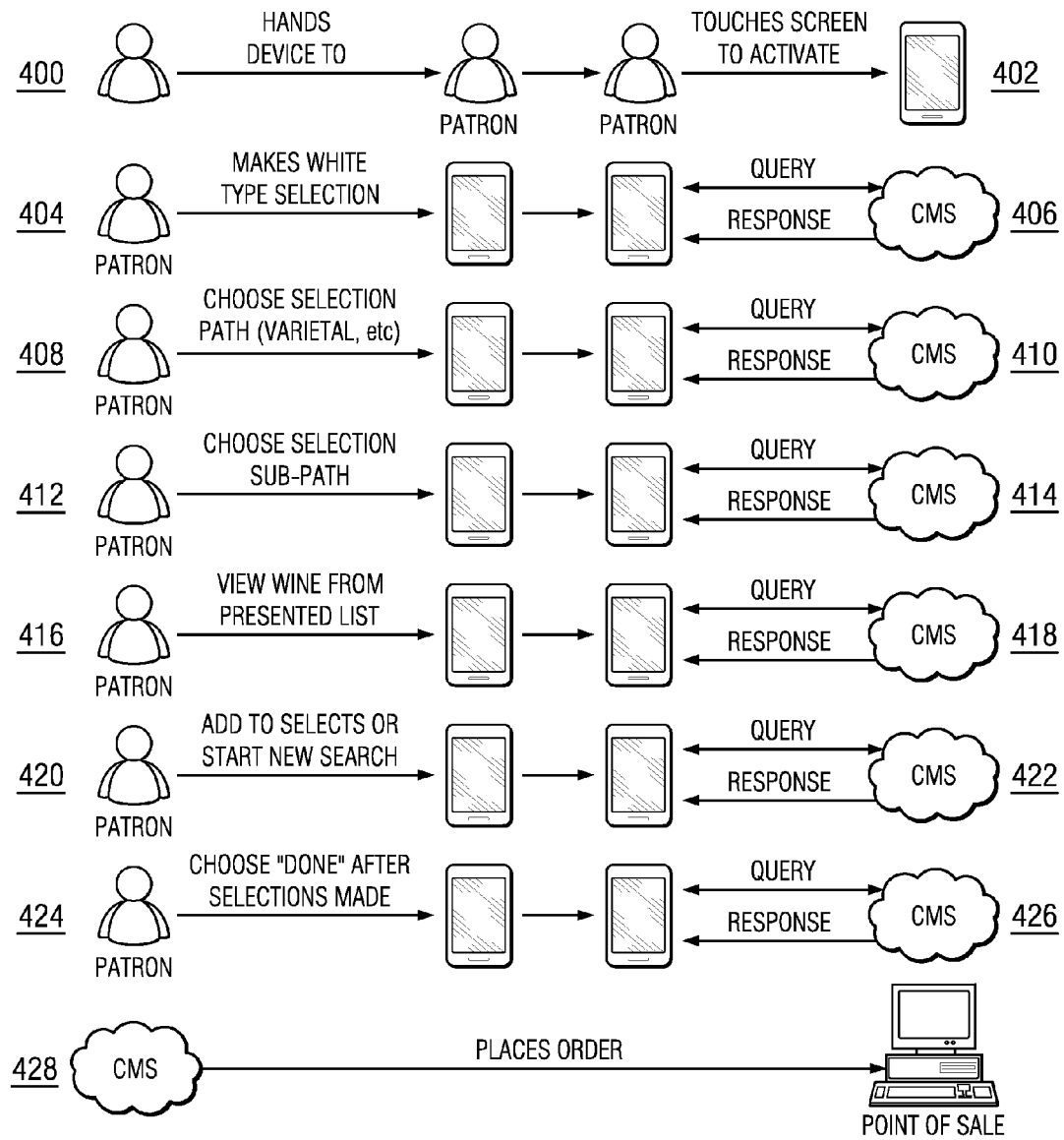
FIG. 4 is a diagrammatic representation of a second selection process as described herein.
Figure 4:
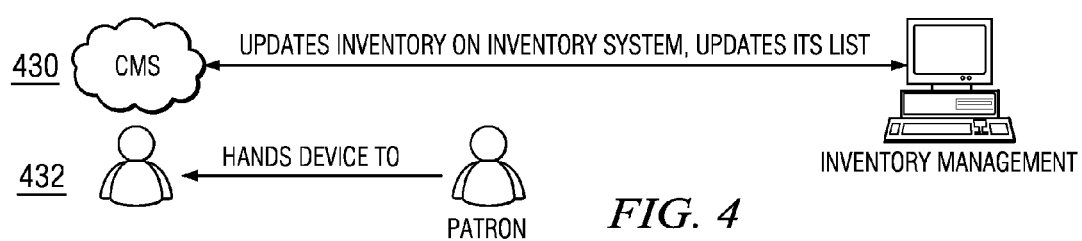

FIG. 4 is a diagrammatic representation of a method of selecting and ordering a wine as described herein. Steps 400 through 426 of FIG. 4 are identical to or essentially the same as steps 300 through 326 of FIG. 3. In the embodiment illustrated in FIG. 4, after the patron has completed his or her selections and selected the "done" or "order complete" option at step 424, content management system 104 transmits the patron's selections to a point of sale device at step 428. This feature eliminates the need for the sommelier or waiter to physically enter the patron's order using a point of sale device. At step 430, content management system 104 updates the database of available wine inventory. Content management system 104 may also interface with inventory control system 126 (FIG. 1) to update the restaurant's inventory. In one embodiment, the inventory database maintained by content management system 104 and/or by the restaurant 102 is updated serially and continuously such that if a wine becomes unavailable before a patron completes his or her order, the patron may be notified that a selected wine is no longer available. At step 432, the patron returns the patron display device 120 to the sommelier or waiter.

Figure 5A:
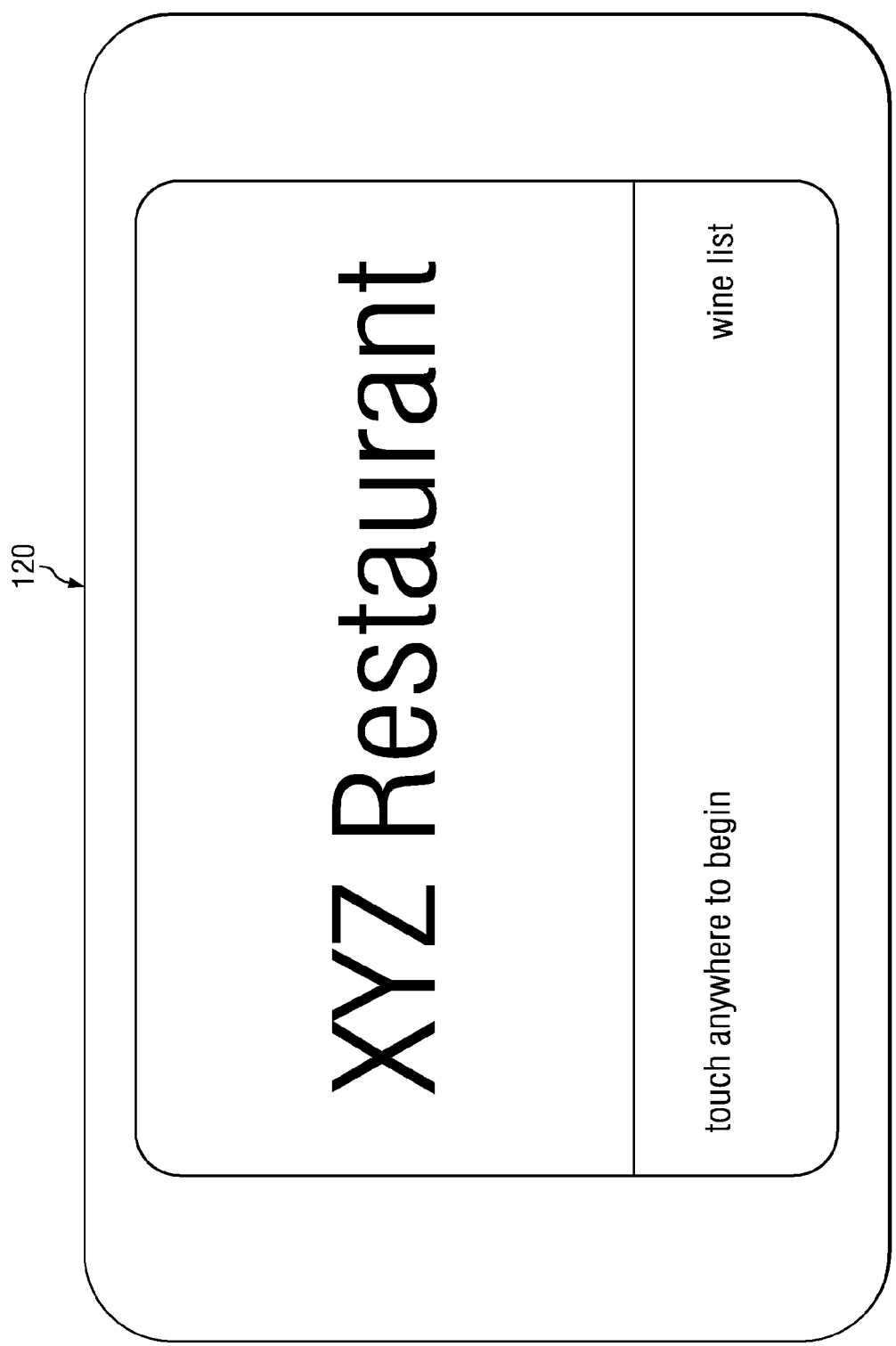
Figure 5B:
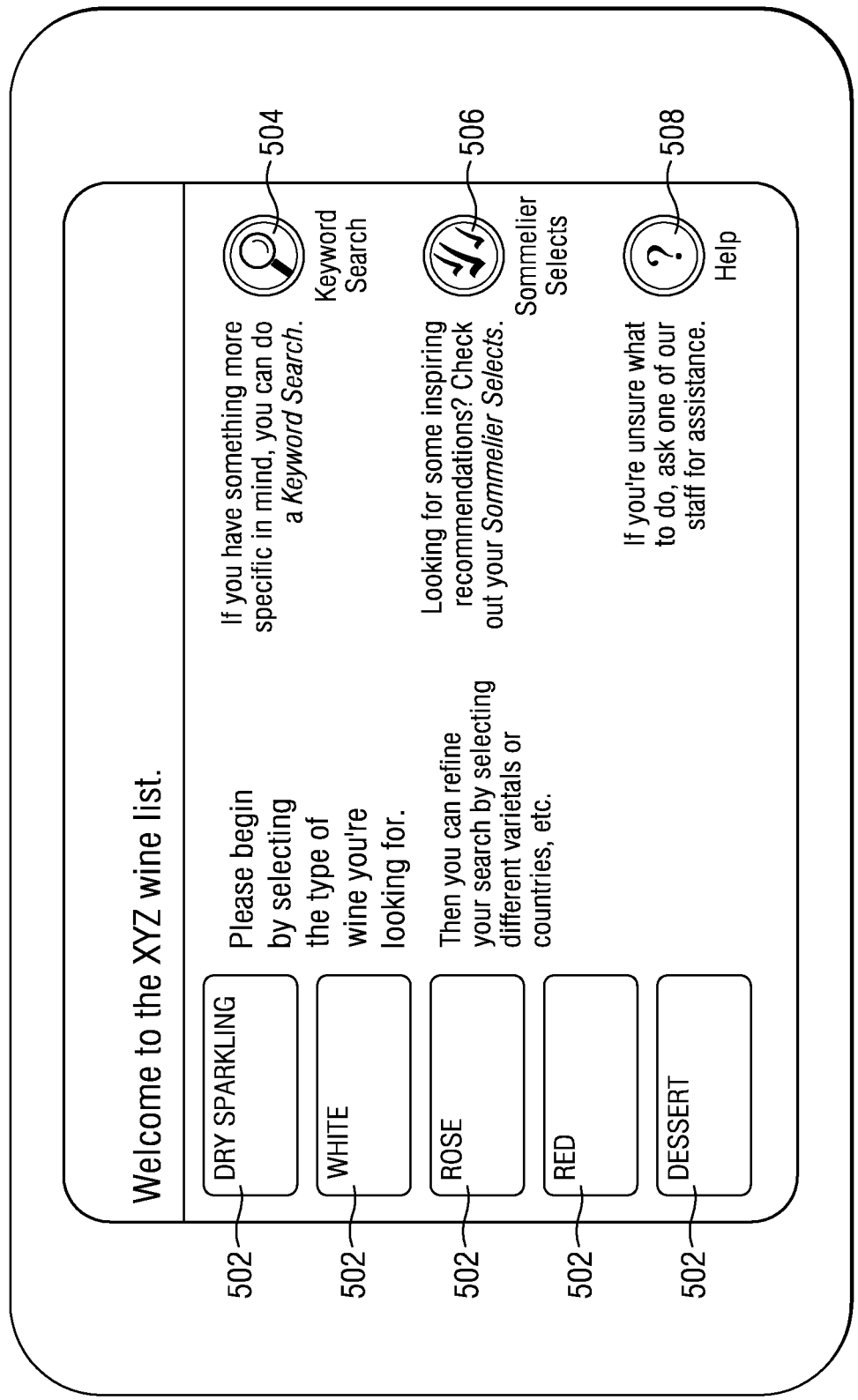

FIGS. 5A through 5J are a series of screens that may be displayed on patron display device 120 (FIG. 1) to aid a patron in making wine selections. FIG. 5A is an initial screen that prompts the patron to begin the process by touching screen 128 of patron display device 120. After the patron initiates the selection process by touching screen 128, a screen such as shown in FIG. 5B may be displayed. The screen of FIG. 5B prompts the patron to select a type of wine using buttons 502. The patron is also given the option of performing a keyword search by means of button 504, viewing wine recommendations using button 506 or summoning a staff member for assistance with button 508.

Figure 5C:
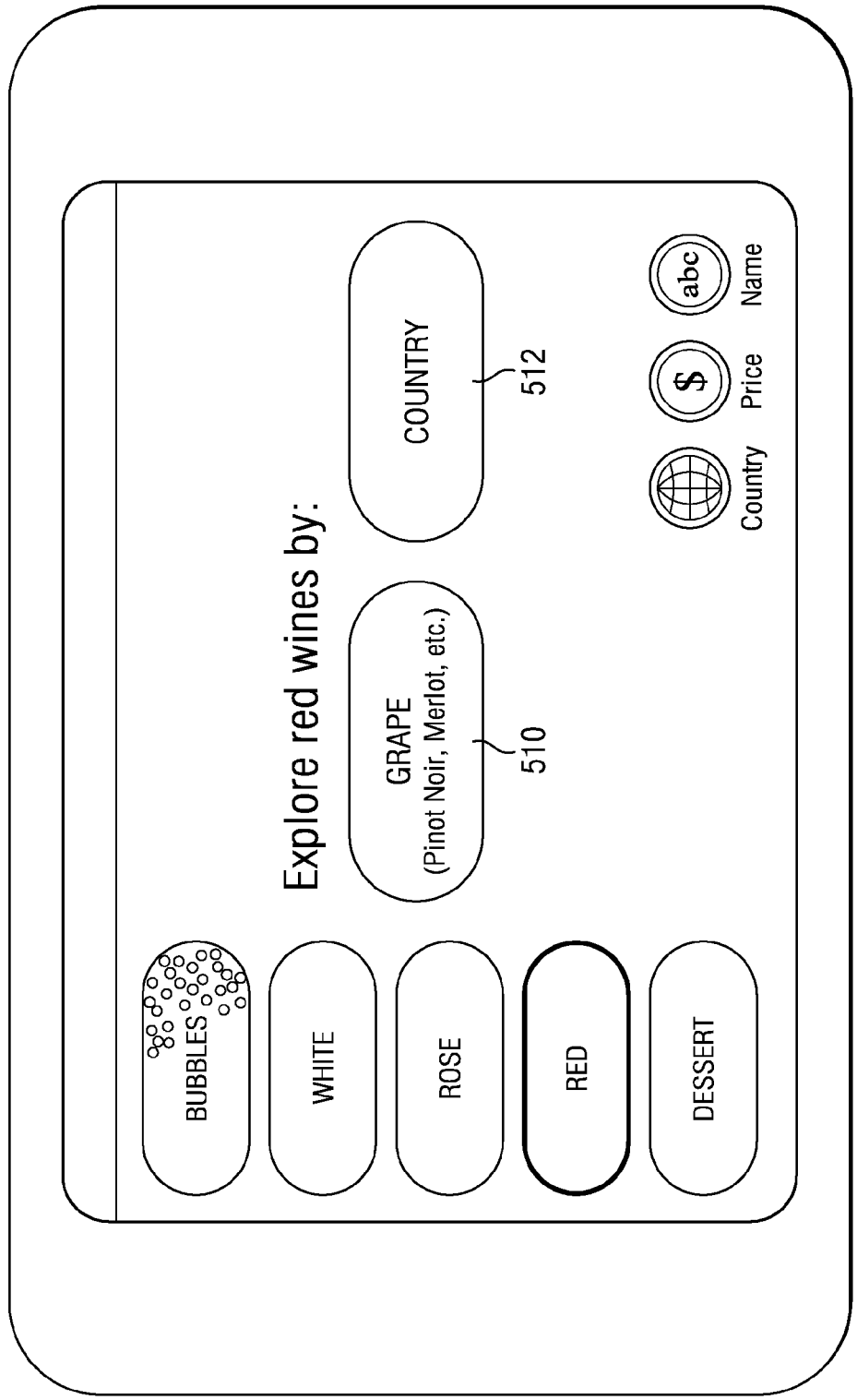
Figure 5D:
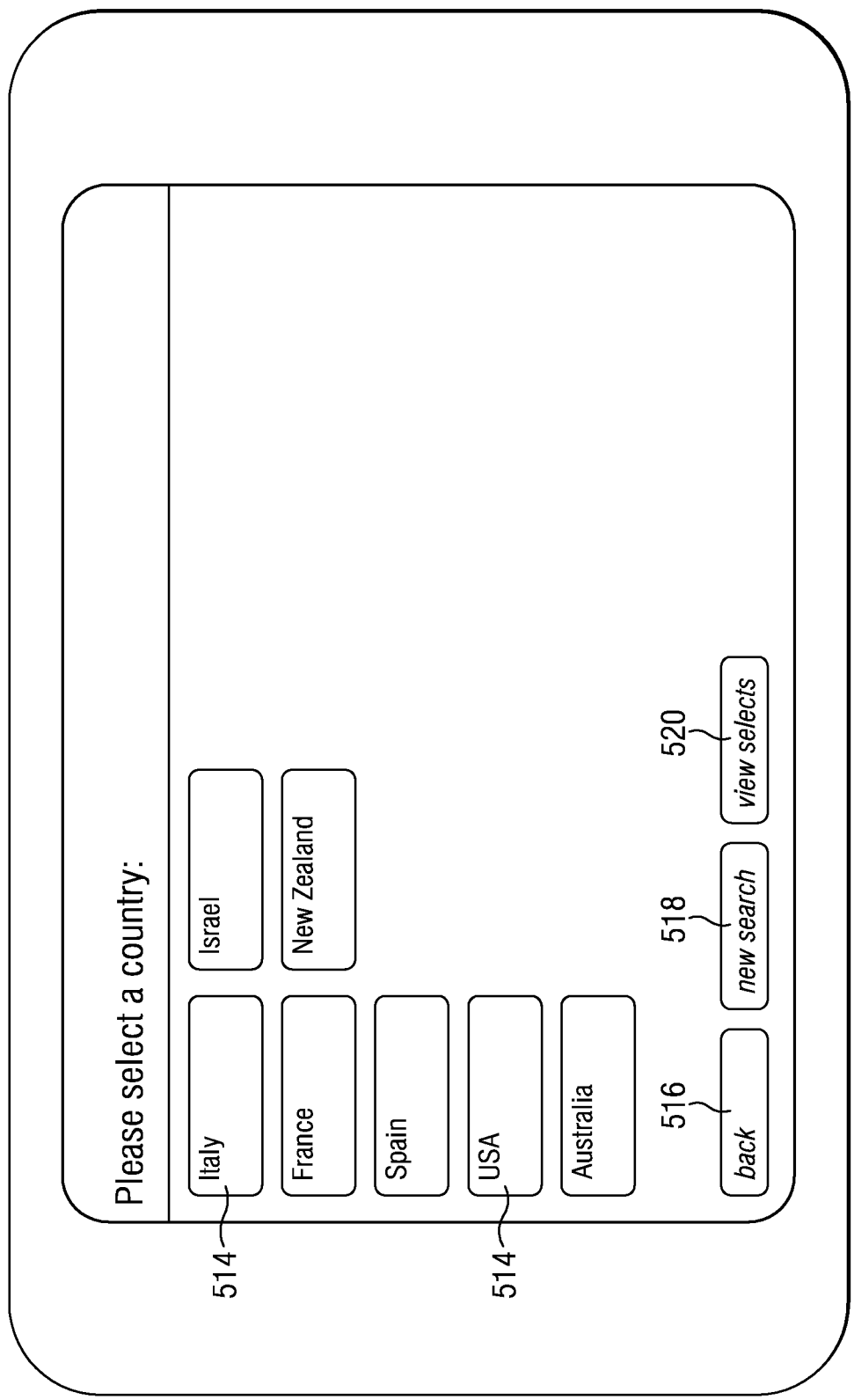

Assuming the patron has selected a red wine, a screen such as illustrated in FIG. 5C may be displayed. The screen of FIG. 5C enables the patron to continue to narrow his or her search by grape (variety), button 510 or by country, button 512. Assuming that the patron elects to narrow his or her search by country, a screen such as shown in FIG. 5D may be presented. As illustrated, the screen of FIG. 5D enables the patron to select different countries of origin using buttons 514 to continue his or her search. The screen of FIG. 5D also includes a "back" button 516 that enables the patron to move backwards in the search process. The patron may also initiate a new search with button 518 and view previously selected wines using button 520. If the patron, for example, selected Italy using screen 5D her or she may be presented with a screen as illustrated in FIG. 5E.

Figure 5F:
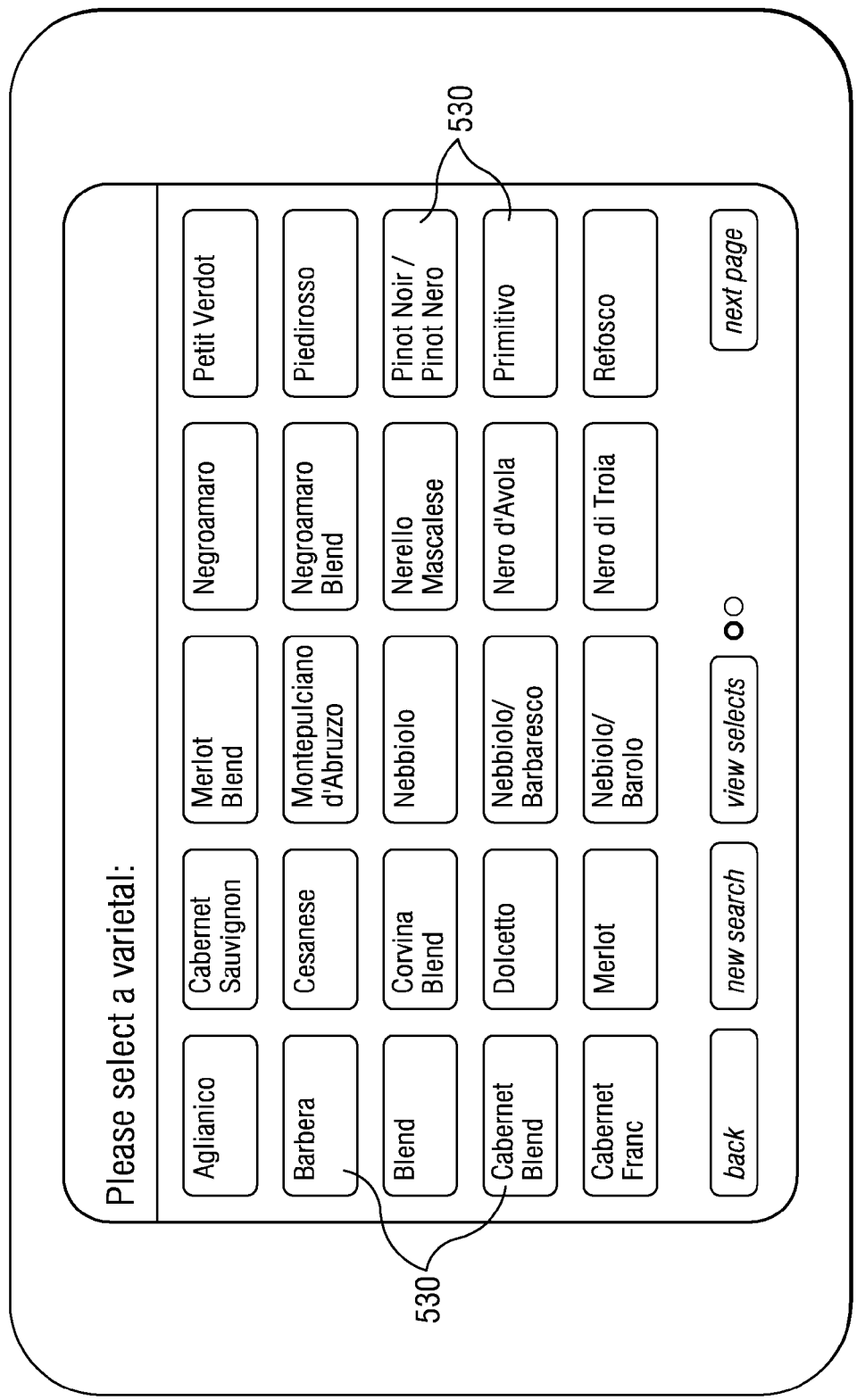
Figure 5G:
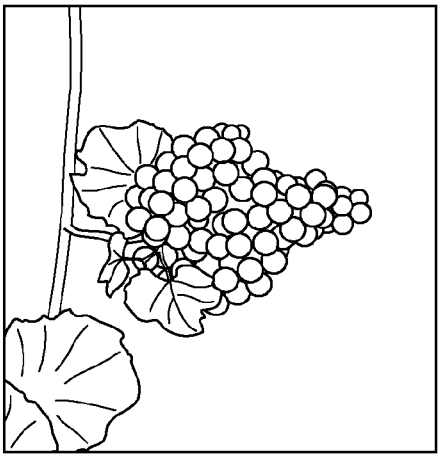
Figure 5H:

The screen of FIG. 5E enables the patron to view available Italian red wines. The screen of FIG. 5E further enables the patron to sort the available wines by name with button 522, by price with button 524 or by vintage with button 526. A "next page" button 528 enables the patron to scroll to the next page or the next display in the selection process. Referring again to FIG. 5C, if the patron had chosen to select a wine based on variety using the "grape" button 510, a screen such as shown in FIG. 5F may be displayed to the patron. As illustrated, the screen of FIG. 5F includes a number of buttons 530 each identifying a different wine variety thereby enabling the patron to narrow his or her search to a specific grape. If, for example, the patron selected Refosco from the screen of FIG. 5F, he or she may be presented with a screen similar to that illustrated in FIG. 5G which describes the Refosco variety of grape. If the patron elects to select a Refosco variety, he or she may be presented with a screen as illustrated in FIG. 5H. The screen of FIG. 5H illustrates the label of a bottle of Refosco type wine available. The screen of FIG. 5H also includes a "add to selects" button 532 which the patron may use to add the particular wine to his list of selections.

Figure 5I:
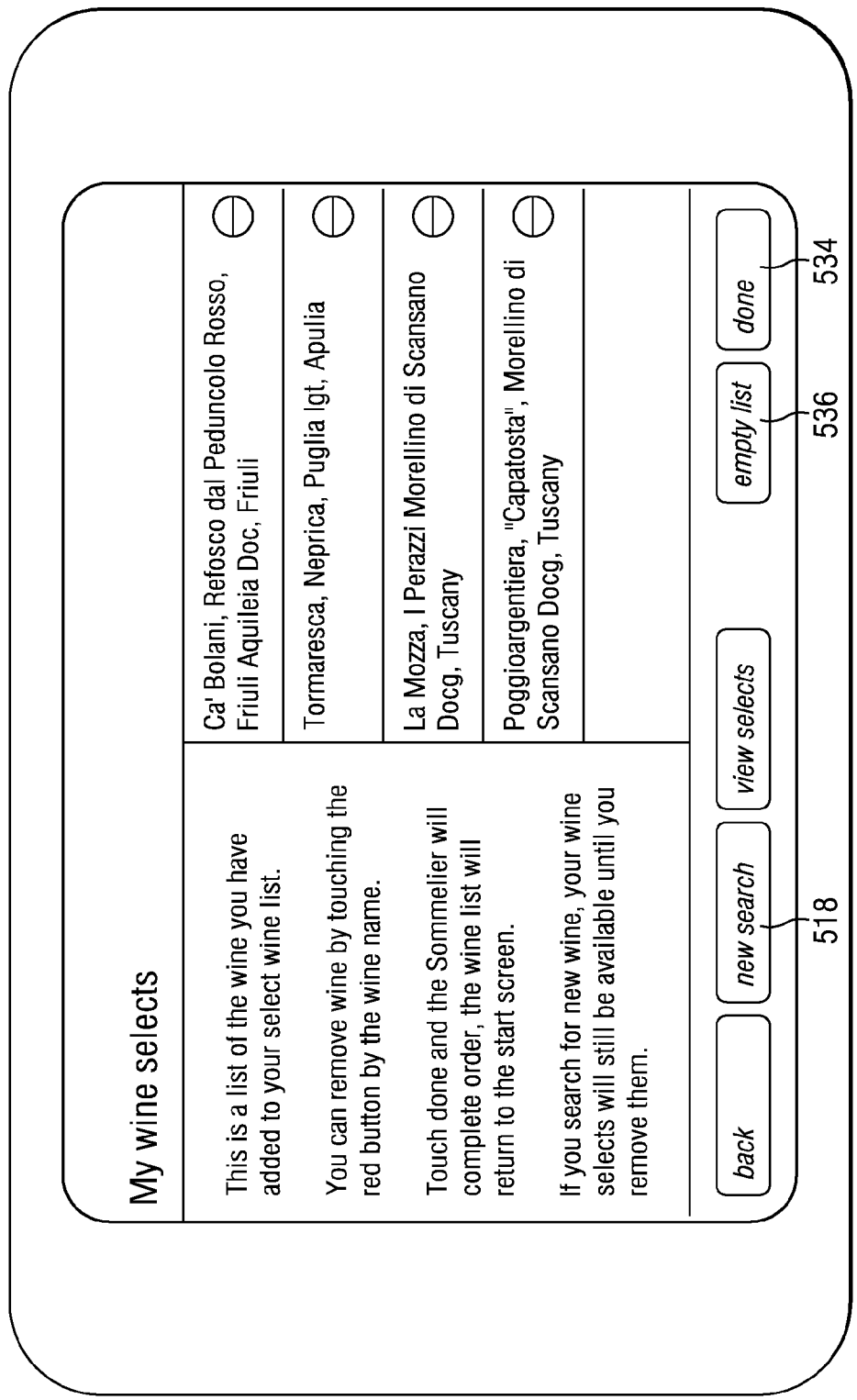
Figure 5J:
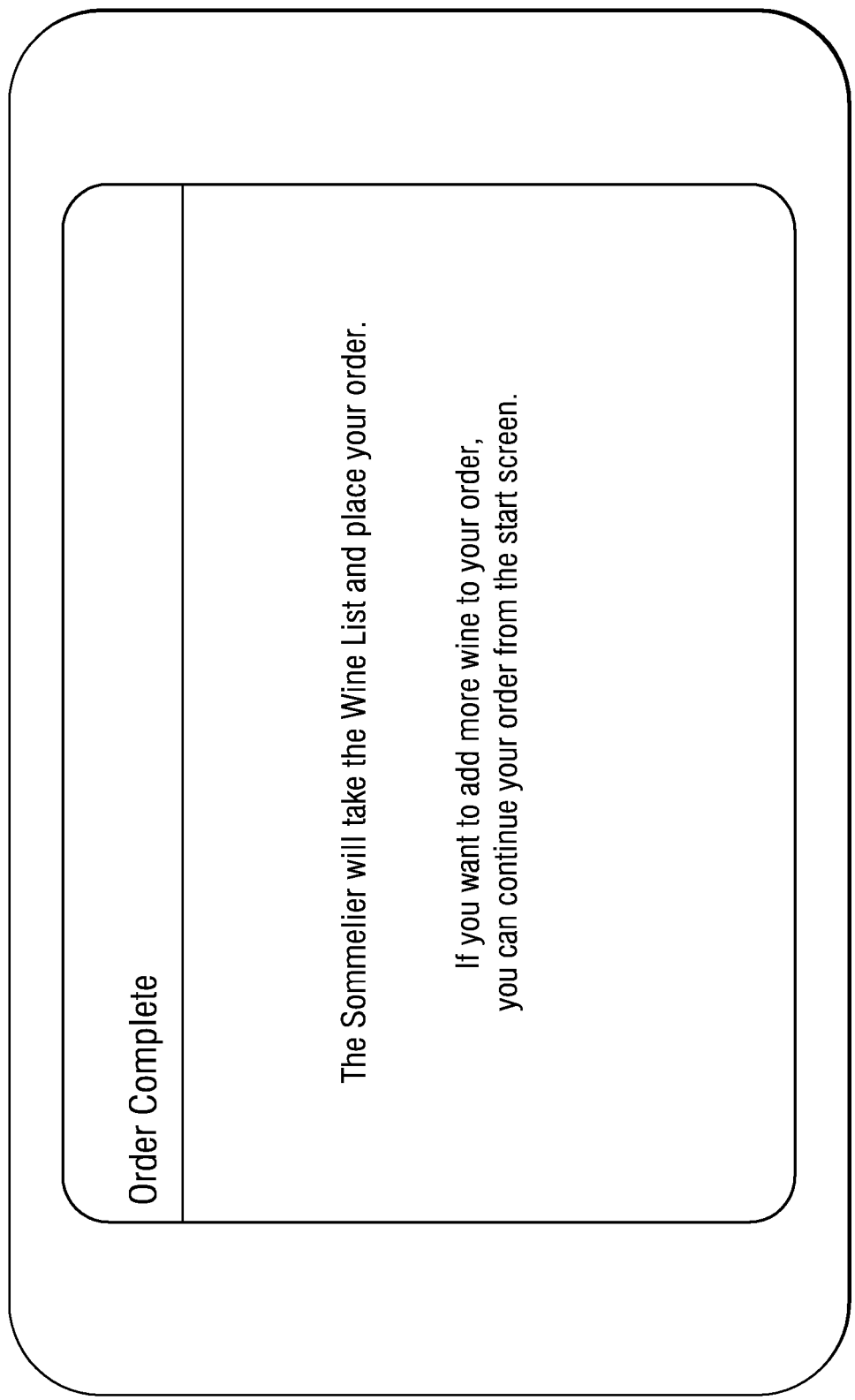

Referring now to FIG. 5I, as a patron continues the selection process, he or she may view a list of wines that he or she has selected. The patron may also be given the option of emptying the selection list using button 536 and/or initiating a new search using button 518. The display of FIG. 5I also includes a "done" button 534 that the patron may use to conclude the selection process. Assuming that the patron elects to conclude the search and selection process using button 534, the patron may be presented with a screen as shown in FIG. 5J. The screen of FIG. 5J directs the patron to return patron display device 120 to the sommelier who will place the patron's wine order.

Figure 6:
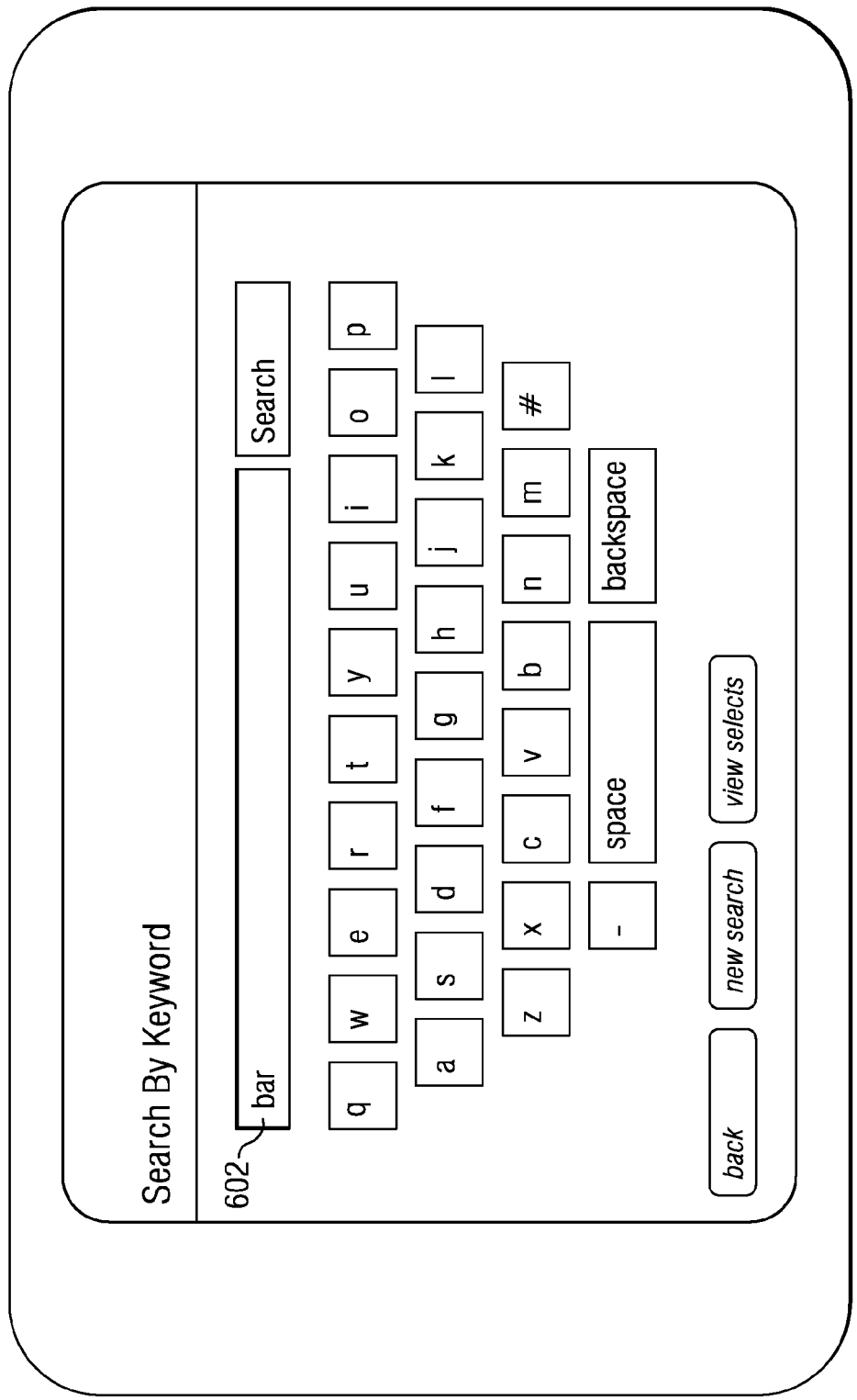
FIGS. 6 and 7 are additional screens that may be displayed on a patron display and selection device to aid a patron in drink selections.
Figure 7:
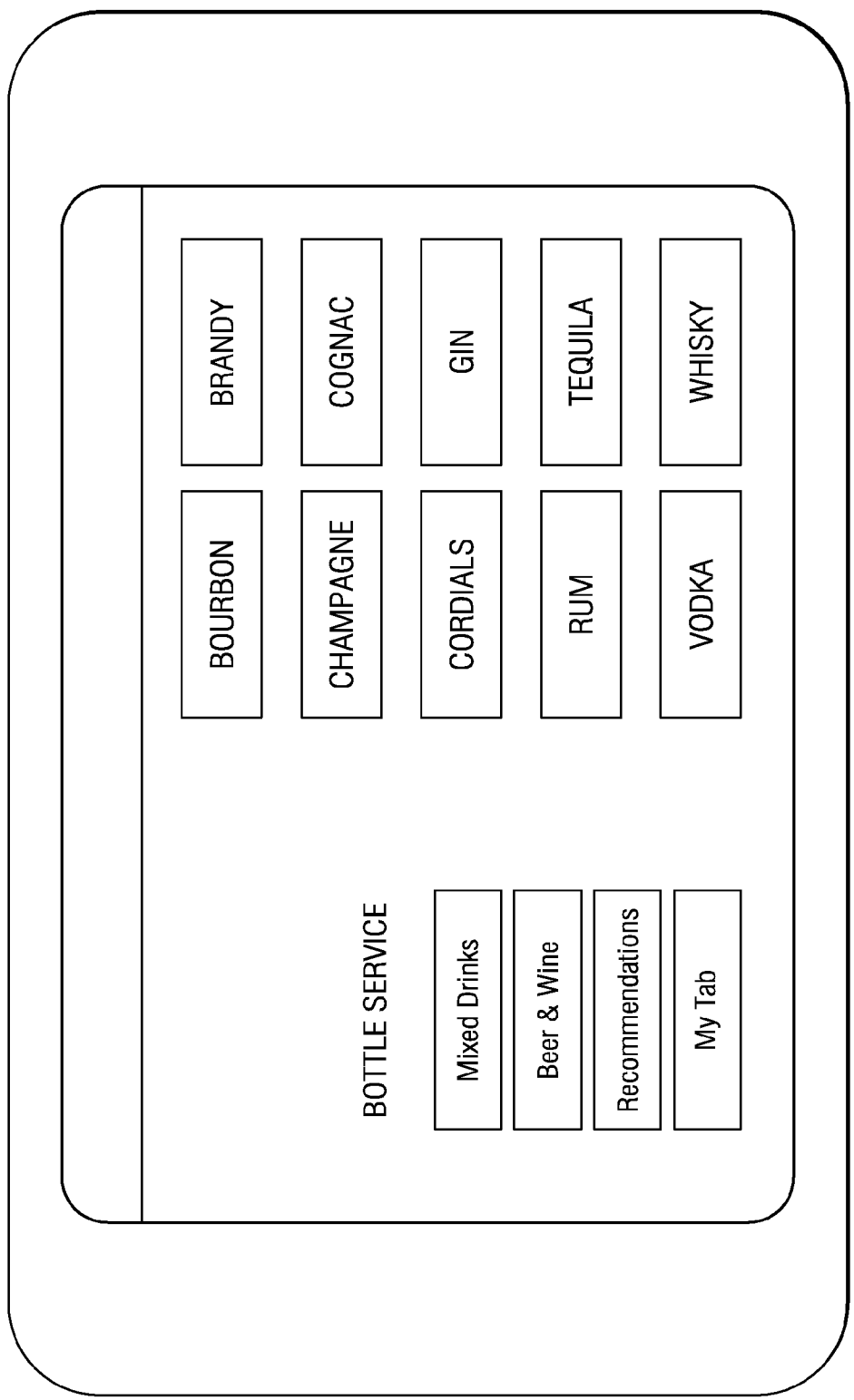

Referring now to FIG. 6, in some embodiments the patron may be given the option of searching by keyword. For example, if the patron entered the word "bar" into the display of FIG. 6, the patron may be presented with a screen such as shown in FIG. 7 giving the patron the option of selecting a bar drink. In this manner, system 100 of FIG. 1 may provide the patron with the option of ordering not only wines but also bar drinks and potentially other items.

Referring still to FIG. 6, in some variations, system 100 may be implemented to include features such as suggestive searching. In these embodiments, system 100 may include an algorithm and/or database that identifies common misspellings of various terms and suggests alternate possibilities. For example, if a patron searching for Italian inadvertently entered "Itaaly" rather than "Italy" in search box 602 of FIG. 6, the patron may be presented with a prompt, for example "Did you mean Italy?" The patron may then correct his or her selection, if necessary. A word completion feature may also be included. Thus, when the patron begins to enter a term in search box 602, he or she may be presented with a list of possible terms corresponding to the letters and or numbers that he or she has entered. The suggestive searching feature and word completion features may be implemented with pre-programmed instructions and/or databases resident on content management system 104 (FIG. 1). Alternatively, the suggestive searching function and/or word completion functions may be implemented with preprogrammed instructions and/or databases resident on patron display device 120.

In other embodiments, system 100 may utilize tag type searching wherein words, terms or phrases are used to "tag" records in a database such as illustrated in FIG. 1B. For example, a wine may use a visual logo of a pink elephant on the bottle label, even though the name of the wine, producer or appellation may not use the term "pink elephant" or have any other association with a pink elephant. However, the record for the wine in the database may have associated tags "pink," "elephant" or "pink elephant" in the record for the wine. Thus, a patron who remembers only that the label for a desired wine includes a representation of a pink elephant may enter "pink," "elephant" or "pink elephant" and locate any corresponding wine selections tagged with "pink," "elephant" or "pink elephant."

Figure 8:
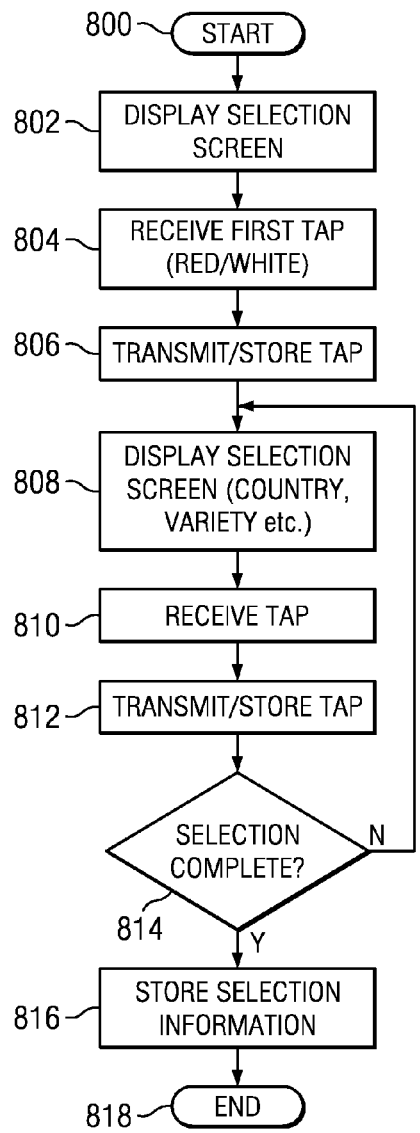
FIG. 8 is a flowchart illustrating a process for receiving and collecting information relating to wine selections by patrons according the system and method disclosed herein.

FIG. 8 is a flowchart illustrating a process for receiving and collecting information relating to wine selections by patrons. It will be understood that the process of FIG. 8 may be conducted concurrently with, or as part of, the process described in connection with FIG. 2. The process begins at step 800 when the sommelier or waiter presents a patron with a patron display device 120 (FIG. 1) for use in making a wine or other drink selection. The patron activates the device, for example by touching display screen 128 of patron display device 120 and a selection screen such as illustrated in FIG. 5B is presented at step 802.

At step 804 a first "tap" or selection is received from the patron. In one embodiment the selection may be between a red wine or white wine. Referring to FIG. 5B, the patron makes the selection by "tapping" or pushing one of buttons 502 presented on the display. The tap or selection is transmitted to content management system 104 and stored in database 110 at step 806. Upon receipt of the tap, content management system may select a subsequent selection screen based on the first tap. For example, if the patron selected a red wine, content management system 104 may transmit a screen for display at step 808 prompting the patron to select a country of origin or specific variety (grape) of red wine.

At step 810, a second or subsequent tap is received from the patron, transmitted from patron display device 120 to content management system 104 and stored at step 812. At decision block 814, the patron may indicate that his or her selection is complete. If not, the process loops back to step 808 where a subsequent selection screen is displayed. If, at step 814, the patron indicates that he or she has completed his or her selection, any desired selection information, for example price, quantity, vintage etc. that has not been previously stored by content management system 104 may be stored in database 110 (FIG. 1) at step 816. The process ends with step 818 when the patron has completed the selection process.

Figure 9:
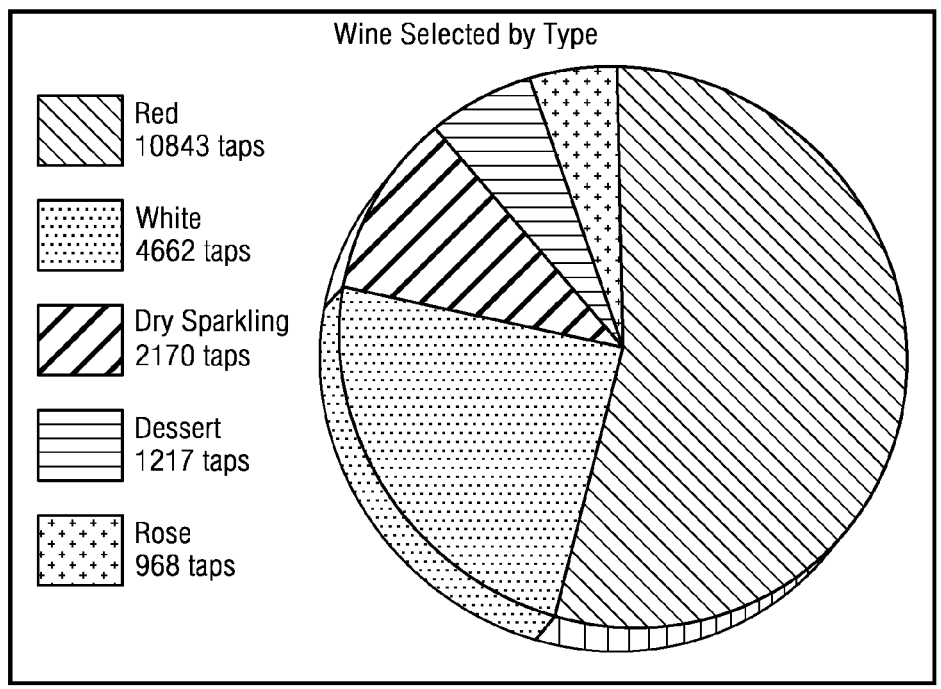
FIGS. 9-12 are graphical representations of data relating to wine selections that may be collected in one embodiment of the system and method described herein.
Figure 10:
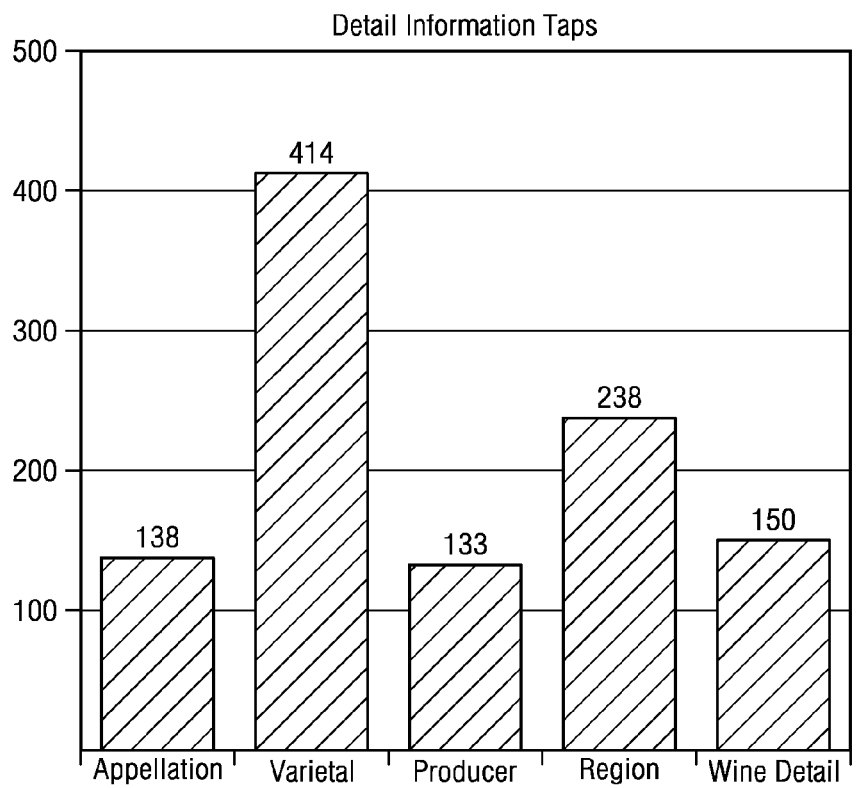
Figure 11:
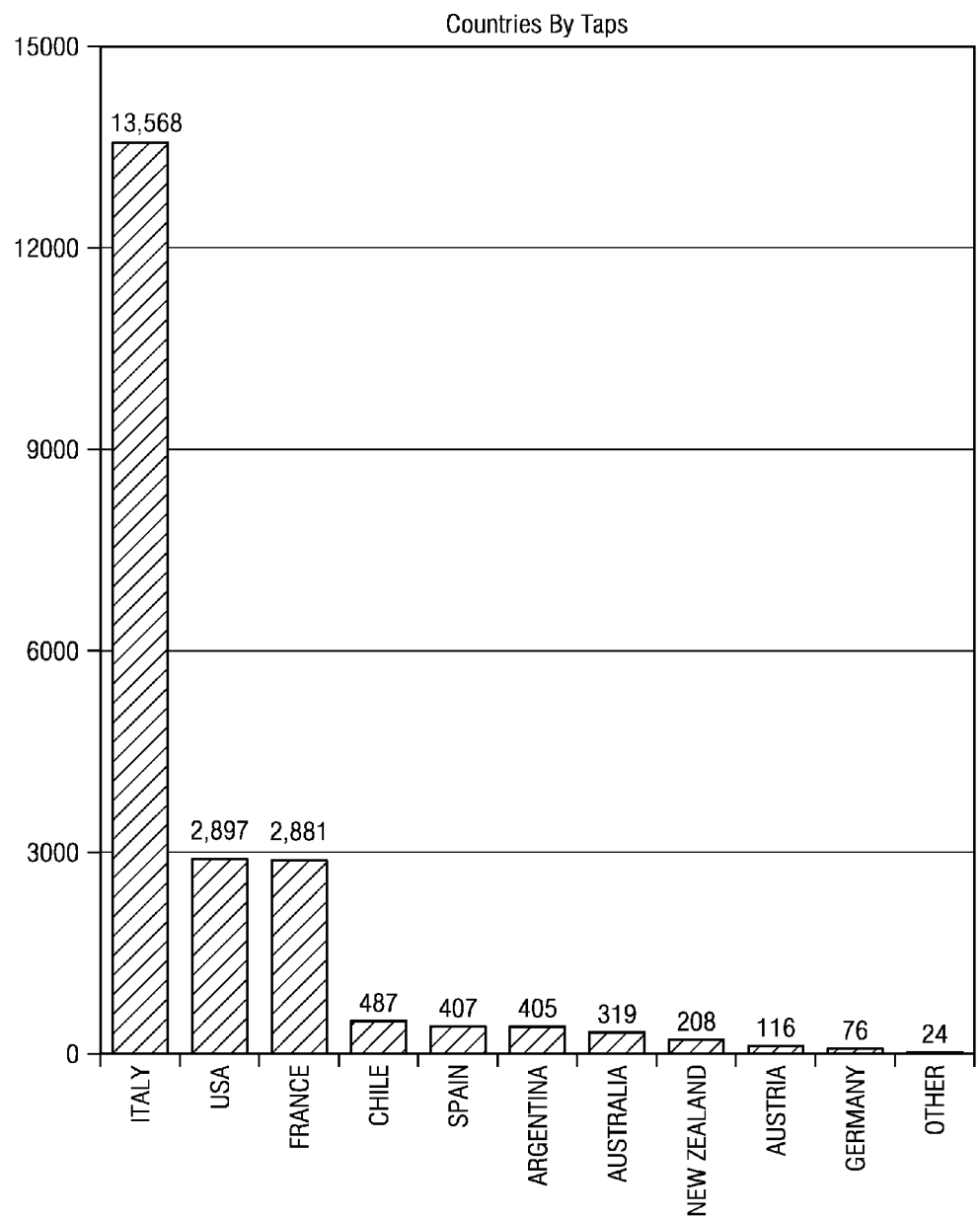

FIGS. 9-11 are graphical representations of the type of data that may be collected in connection with the wine selection process described herein. For example, FIG. 9 illustrates the number of "taps" or selections of red, white, dry sparkling, dessert and rose wines made by patrons during a predetermined time period. FIG. 10 illustrates the number of "taps" or selections by appellation, variety, producer, region and wine detail. It will be understood that patron selections or "taps" may be sorted in a variety of manners that do not necessarily correspond to the screens displayed on patron selection devices 120 or to the actual selections made by patrons. For example, a patron may select a particular wine based upon country and variety without specifying a specific producer; however, the collected information may enable content management system 104 to sort the selections by producer.

Figure 12:
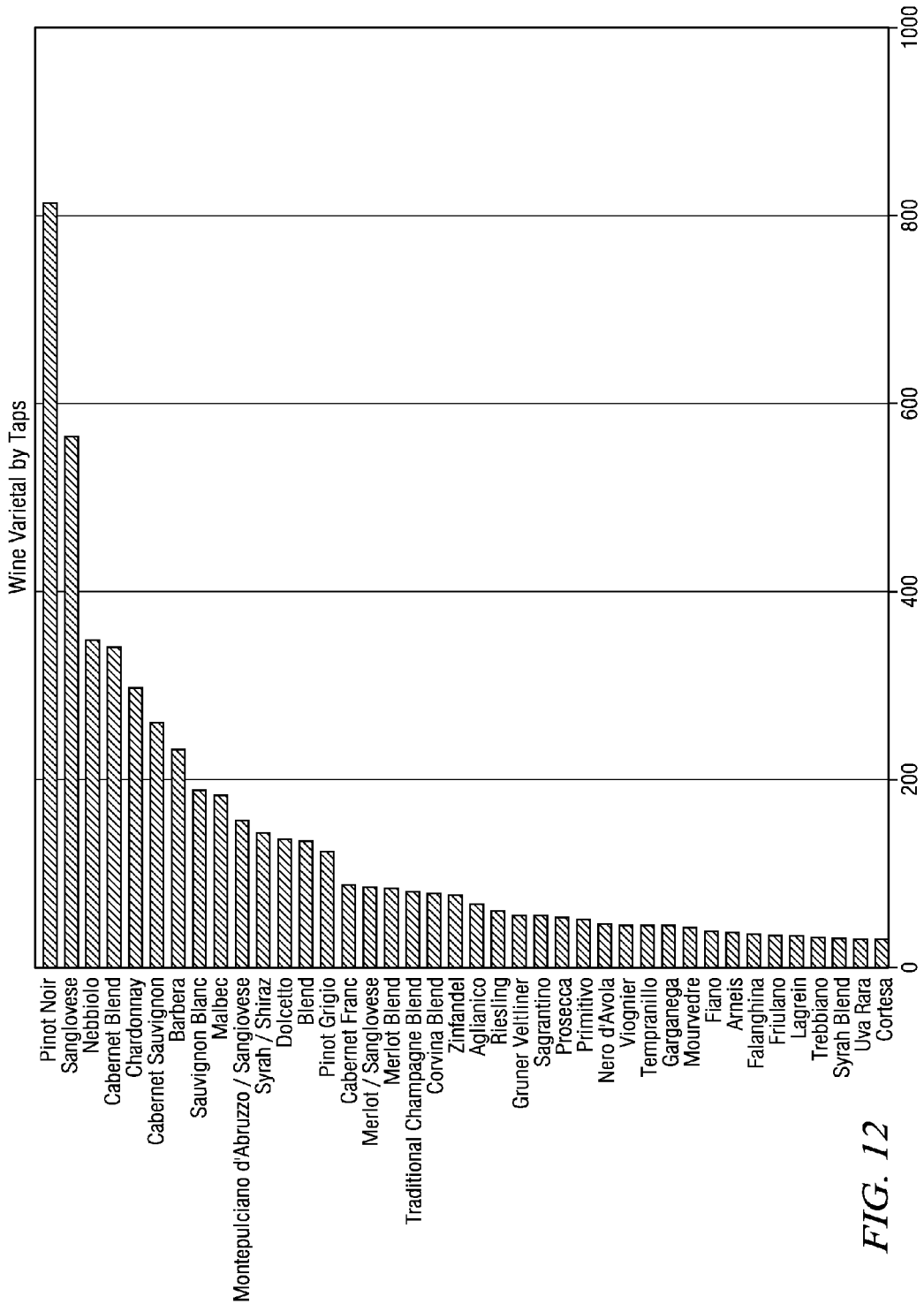

FIGS. 11 and 12 illustrate patron selections by country and variety. The collected information may be used to identify more and less popular wines, trends in patron selection, and seasonal trends. This information may, in turn, be used to adjust inventory levels, determine appropriate order quantities and identify the types of wine a particular restaurant should maintain in inventory. For example, if the demographics of the patrons of a particular restaurant are known, the collected information may be used to determine what wines a restaurant serving a similar demographic area should maintain in inventory. Similarly, the information may be correlated with the particular type of cuisine, e.g., French, German or Italian, served at a restaurant. In this manner, a restaurant proprietor may select appropriate types and appropriate inventory levels of wines offered at the restaurant.

Referring to FIGS. 13A-13D, system 100 (FIG. 1) may be utilized to present advertising or branding information to restaurant patrons via patron display devices 120. The advertising and branding information may be stored on one or more databases 110 (FIG. 1) and transmitted as a screen or part of a screen for display on a patron display device 120 at different times when the patron display device is in use by a restaurant patron. For example, a promotion for a product, event or business may be displayed for a brief period, for example several seconds, when patron display device 120 is activated or at various other times or stages during the wine selection process. In other variations, a "continue" or "next" button 1302 (FIG. 13A) may be presented as part of the display. In this case, the promotional material will be displayed until the patron presses the "continue" or "next" button.

Such promotional displays may be fixed, e.g., the same displays are presented to each patron at the same stage or stages during the selection process. In other embodiments, selected promotional screens may be linked to a particular selection parameter, for example by means of a relational database, and displayed in response to a patron's response to a particular wine selection or selection criteria. Multiple related or unrelated advertisements or similar promotions may be displayed on a single display screen.

Figure 13A:
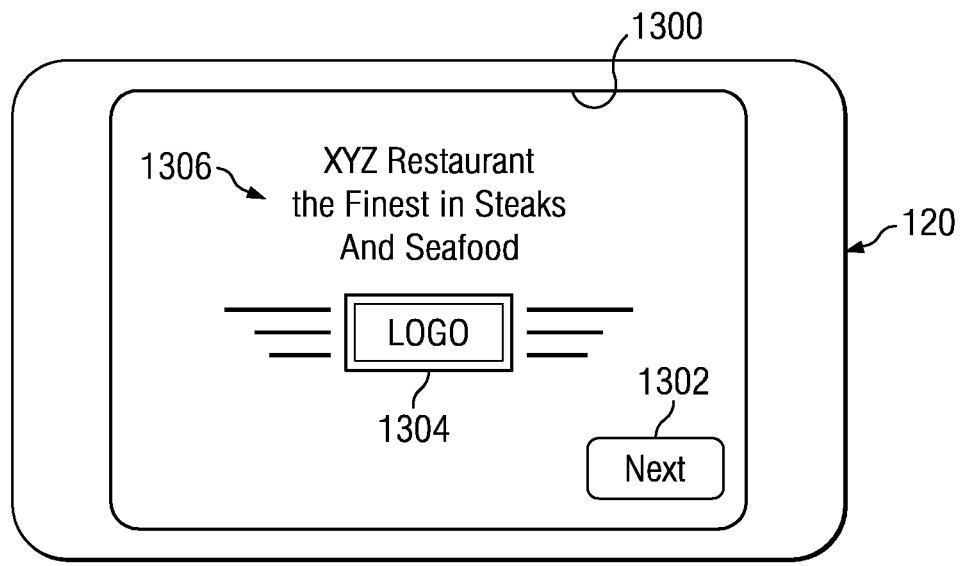
FIGS. 13A-13D are exemplary representations of display screens for branding and promotional purposes.
Figure 13B:
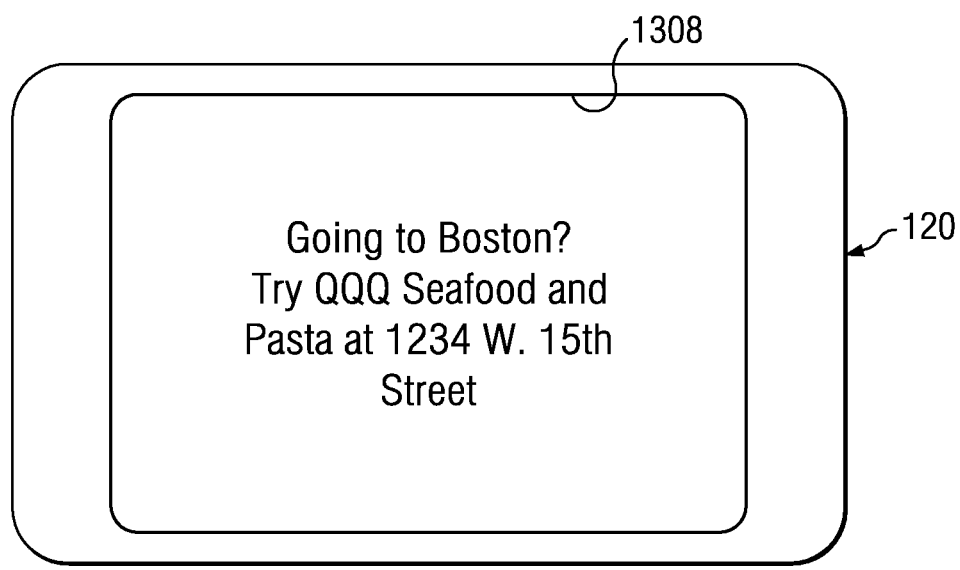

A variety of different screens may be used for branding and promotion of different goods and services. FIG. 13A is a representative branding screen for a restaurant where system 100 (FIG. 1) is implemented). The screen may include a logo, trade or service mark 1304 used by the restaurant and/or promotional text or similar materials 1306. An exemplary screen 1308 for a related or affiliated restaurant in the same or different city or location is illustrated in FIG. 13B.

Figure 13C:
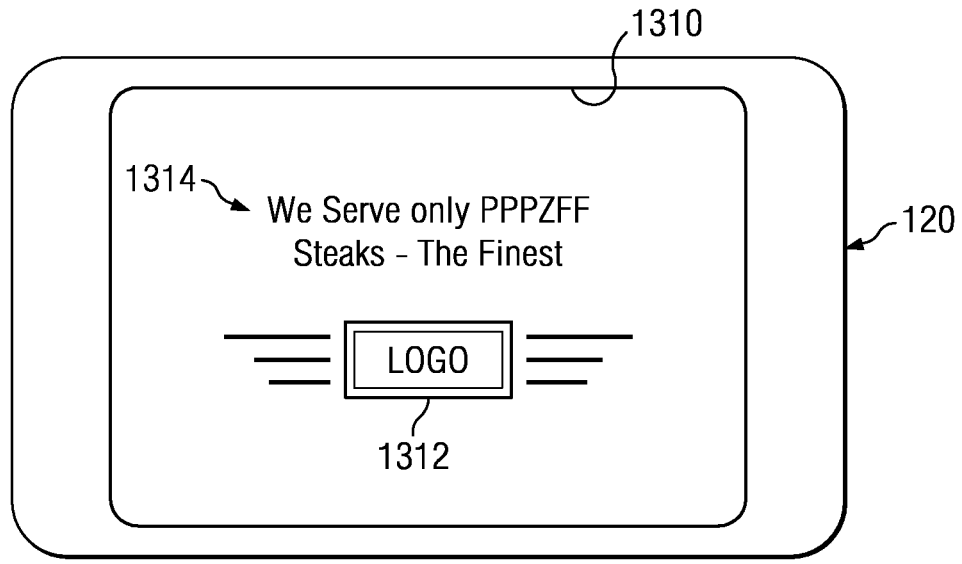
Figure 13D:
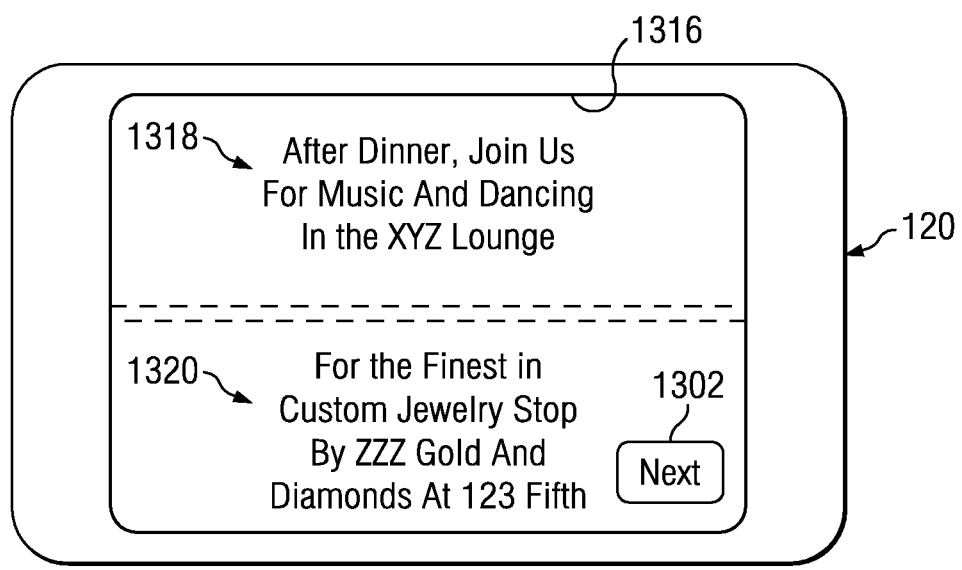

A display screen 1310 may be used to promote products served at a restaurant where system 100 is implemented as illustrated in FIG. 13C. A logo 1312 and/or promotional text 1314 promoting the particular product may be included in the display screen 1310. Multiple goods or services may be incorporated into a single display screen. For example, the exemplary screen 1316 of FIG. 13D includes promotional material 1318 for a lounge and additional promotional material 1320 for a jewelry store.

Figure 14:
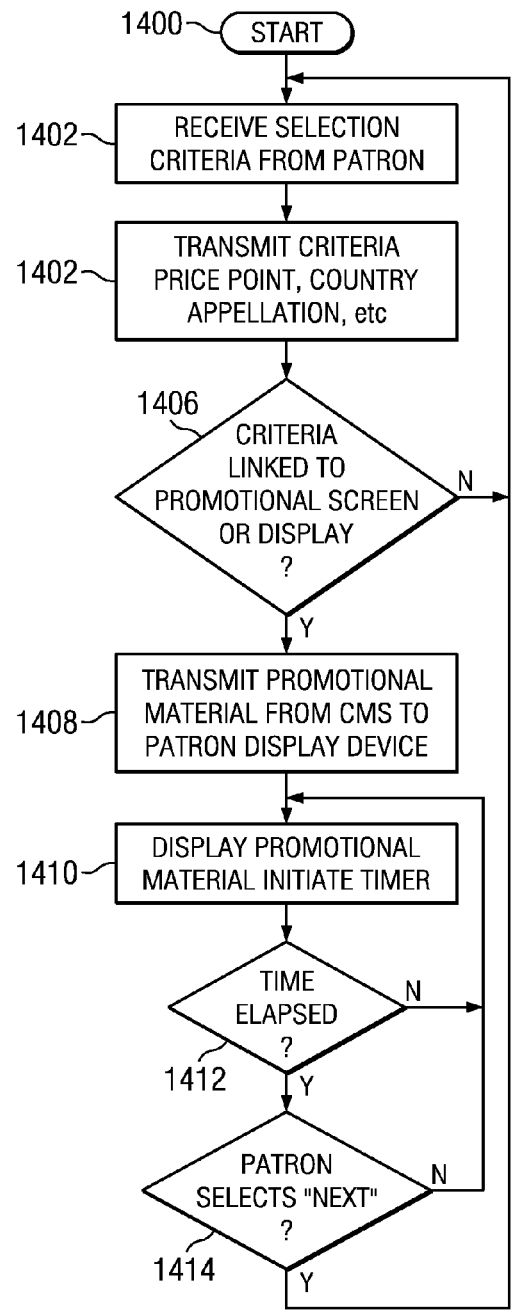
FIG. 14 is a flowchart of a method utilizing a system as described herein for display of promotional materials.

FIG. 14 is a flowchart of a method wherein different display screens for different products and services may be selected for display to different patrons based on selection criteria identified by the patron during the wine selection process or associated with a particular selection or criteria. The method begins at step 1400 where a patron display device 120 is activated. At step 1402, a selection parameter is received from the patron using patron display device 120. The linked selection criteria may, for example, be a country of origin, a price point or price range corresponding to a selection or other parameter such as, but not limited to, those illustrated in FIG. 1B. The selection criteria is from patron display device 120 to content management system 104 at step 1404 and compared to a list of linked criteria or parameters at decision block 1406. If the parameter, for example, price point or country of origin, is not linked to the promotion screen or display, the process loops back to step 1404 and the wine selection process continues.

If the selection criteria or parameter is linked to a specific display of promotional material, the display screen is transmitted from content management system 104 to patron display device 120 at step 1408 and displayed to the patron at step 1410. In one embodiment, a timer may be initiated at step 1410 to limit the amount of time the display is presented to the patron. In other embodiments, the display may include a "next" button such as button 1302 of FIG. 13A. If the timer elapses at decision block 1412, or if the patron presses the "next" button at step 1414, the process loops back to step 1402 and the method is repeated until the selection process is completed.

It will be appreciated by those skilled in the art having the benefit of this disclosure that this system and method to enable a restaurant patron to select a wine based upon available inventory provides a convenient, patron-friendly means and method of making a wine selection from wines in the restaurant inventory. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A method of enabling a restaurant patron to make a wine selection based on available inventory at the restaurant including:

providing interactive hand held display devices for use by the restaurant patrons, the interactive hand held display devices operable to sequentially receive and display a series of selection screens from a content management system, each selection screen prompting the patron to make a selection including a wine characteristic associated with wines available in the restaurant wine inventory;

a) transmitting a selection screen to a patron, the selection screen promoting the patron to identify a first wine characteristic;

b) receiving a response from a patron to a first selection screen, the first response identifying a wine characteristic;

c) transmitting a sequential selection screen to the patron, the sequential selection screen identifying only wines having the identified characteristic, the sequential selection screen prompting the patron to identify a sequential wine characteristic associated with a wine identified in the sequential wine selection screen;

d) receiving a sequential response to the sequential selection screen from the patron identifying a sequential wine characteristic;

e) repeating steps c) and d) until the patron has selected a wine;

transmitting a confirmation screen from the content management system to the patron, the confirmation screen prompting the patron to confirm the wine selection;

receiving a confirmation of the wine selection with the interactive hand held display device;

transmitting the confirmation from the interactive hand held display device to the content management system;

checking available inventory for availability of the wine selection;

if the available inventory of the wine selection is less than a predetermined number of bottles, prompting the patron to reserve one or more bottles of the wine selection;

reserving one or more bottles of the wine selection whereby the one or more bottles of the wine selection are removed from available inventory for delivery to the patron at the patron's request; and storing the patrons responses to the sequential selection screens in a database associated with the content management system.

2. The method of claim 1 further comprising transmitting informational display screens from the content management system to the interactive hand held devices, the informational screens including information on different varieties of wine, regions and countries of origin of the wines.

3. The method of claim 1 wherein a first selection screen prompts a patron to select one of a red wine or a white wine.

4. The method of claim 1 wherein a first selection screen prompts a patron to select one of a sparkling wine, a white wine, a rose wine, a red wine or a dessert wine.

5. The method of claim 4 wherein a subsequent selection screen prompts a patron to select one of a country of origin or region of origin.

6. The method of claim 4 wherein a subsequent selection screen prompts a patron to select a variety grape used to produce a wine.

7. The method of claim 1 further comprising communicating a patron wine selection from the content management system to a point of sale device whereby the patron wine selection is processed.

8. The method of claim 1 further comprising transmitting display screens including promotional material from the content management system to the interactive hand held devices; and displaying the display screens including promotional material to patrons.

9. The method of claim 8 wherein different display screens including promotional material may be linked to patron responses to selection screens.

10. The method of claim 8 wherein the display screens including promotional material may be linked to a specific drink characteristic associated with the patron response to a selection screen.

11. The method of claim 8 wherein the promotional material includes advertisements for goods and services other than drinks 12. The method of claim 8 wherein the displays including promotional material advertise third-party goods and services not offered by the restaurant.

* * * * *